United States Patent
Chakka et al.

(10) Patent No.: US 12,492,185 B2
(45) Date of Patent: *Dec. 9, 2025

(54) BENZIMIDAZOLE DERIVATIVES AND THEIR USES

(71) Applicant: Teijin Pharma Limited, Tokyo (JP)

(72) Inventors: Nagasree Chakka, Thousand Oaks, CA (US); Hua Gao, Thousand Oaks, CA (US); Angel Guzman-Perez, Thousand Oaks, CA (US); Brett Michael Johnson, Thousand Oaks, CA (US); Madeleine Kieffer, Thousand Oaks, CA (US); Justin Malinowski, Thousand Oaks, CA (US); Laurie Schenkel, Thousand Oaks, CA (US)

(73) Assignee: Teijin Pharma Limited, Tokyo (JP)

( * ) Notice: Subject to any disclaimer, the term of this patent is extended or adjusted under 35 U.S.C. 154(b) by 962 days.

This patent is subject to a terminal disclaimer.

(21) Appl. No.: 17/602,028

(22) PCT Filed: Apr. 10, 2020

(86) PCT No.: PCT/US2020/027624
§ 371 (c)(1),
(2) Date: Oct. 7, 2021

(87) PCT Pub. No.: WO2020/210597
PCT Pub. Date: Oct. 15, 2020

(65) Prior Publication Data
US 2022/0204477 A1 Jun. 30, 2022

Related U.S. Application Data

(60) Provisional application No. 62/832,374, filed on Apr. 11, 2019.

(51) Int. Cl.
*C07D 401/14* (2006.01)

(52) U.S. Cl.
CPC .................. *C07D 401/14* (2013.01)

(58) Field of Classification Search
CPC .............. A61K 31/4545; A61K 31/506; C07D 401/14; A61P 11/00; A61P 13/12
See application file for complete search history.

(56) References Cited

U.S. PATENT DOCUMENTS

| | | | |
|---|---|---|---|
| 4,820,710 A | 4/1989 | Manoury et al. | |
| 8,026,241 B2 | 9/2011 | Balan et al. | |
| 11,332,459 B2 * | 5/2022 | Bartberger | C07D 487/04 |
| 2004/0152690 A1 | 8/2004 | Balan et al. | |
| 2020/0308145 A1 | 10/2020 | Bartberger et al. | |
| 2020/0377505 A1 | 12/2020 | Ledeboer et al. | |

FOREIGN PATENT DOCUMENTS

| | | |
|---|---|---|
| WO | 2019/028308 A1 | 2/2019 |
| WO | 2019/079578 A1 | 4/2019 |

OTHER PUBLICATIONS

Saqib et al. Inflammation Jan. 17, 2023 (Year: 2023).*
Lin et al. PNAS, 2019, vol. 116, No. 20, pp. 10156-10161 (Year: 2019).*
Koichiro Kuwahara et al., "TRPC6 fulfills a calcineurin signaling circuit during pathologic cardiac remodeling", The Journal of Clinical Investigation, 2006, vol. 116, No. 12, pp. 3114-3126 (13 pages total).
Jennifer Davis et al., "A TRPC6-dependent pathway for myofibroblast transdifferentiation and wound healing in vivo", Dev Cell, 2012, vol. 23, No. 4, pp. 705-715 (22 pages total).
Kinya Seo et al., "Hyperactive Adverse Mechanical Stress Responses in Dystrophic Heart Are Coupled to Transient Receptor Potential Canonical 6 and Blocked by cGMP-Protein Kinase G Modulation", Circulation Research, 2014, vol. 114, pp. 823-832 (20 pages total).
Swagat H. Sharma et al., "Design, synthesis and characterization of novel N-heterocyclic-1-benzyl-1H-benzo[d]imidazole-2-amines as selective TRPC5 inhibitors leading to the identification of the selective compound, AC1903", Bioorganic & Medicinal Chemistry Letters, vol. 29, 2019, pp. 155-159 (5 pages total).
"1-[(5-Fluoropyridin-3-yl)methyl]-2-(4-methylpiperidin-1-yl)benzimidazole", PubChem, 2019, Retrieved from: URL: <https://pubchem.ncbi.nlm.nih.gov/compound/137474539> (8 pages total).
Norbert Weissmann et al., "Classical transient receptor potential channel 6 (TRPC6) is essential for hypoxic pulmonary vasoconstriction and alveolar gas exchange", PNAS, 2006, vol. 103, No. 50, pp. 19093-19098 (6 pages total).
Annemarieke E. Loot et al., "Cytochrome P450-Derived Epoxyeicosatrienoic Acids and Pulmonary Hypertension: Central Role of Transient Receptor Potential C6 Channels", J Cardiovasc Pharmacol, 2011, vol. 57, No. 2, pp. 140-147 (8 pages total).
N. Damann et al., "The calcium-conducting ion channel transient receptor potential canonical 6 is involved in macrophage inflammatory protein-2-induced migration of mouse neutrophils", Acta Physiol, 2009, vol. 195, pp. 3-11 (9 pages total).
S.Sel et al., "Loss of classical transient receptor potential 6 channel reduces allergic airway response", Clinical and Experimental Allergy, 2008, vol. 38, No. 1548-1558 (11 pages total).
Yang Xia et al., "Classical Transient Receptor Potential 1 and 6 Contribute to Hypoxic Pulmonary Hypertension Through Differential Regulation of Pulmonary Vascular Functions", Hypertension, 2014, vol. 63, pp. 173-180 (18 pages total).

(Continued)

*Primary Examiner* — Kara R. Mcmillian
(74) *Attorney, Agent, or Firm* — McCarter & English, LLP; Xin Zhang; Zhongyu "Alex" Wang

(57) ABSTRACT

The present invention provides compounds which inhibit the activity of TRPC6, pharmaceutically acceptable salts thereof, pharmaceutical compositions comprising a compound of the invention, a method for manufacturing compounds of the invention and therapeutic uses thereof.

5 Claims, No Drawings

(56) References Cited

OTHER PUBLICATIONS

Sandra Bernaldo de Quiros et al., "Identification of TRPC6 as a possible candidate target gene within an amplicon at 11q21-q22.2 for migratory capacity in head and neck squamous cell carcinomas", BMC Cancer, 2013, vol. 13, No. 116, pp. 1-11 (11 pages total).
Xia Ding et al., "Targeting TRPC6 channels in oesophageal carcinoma growth", Expert Opin. Ther. Targets, 2010, vol. 14, No. 5, pp. 513-527 (15 pages total).
Paola Krall et al., "Podocyte-Specific Overexpression of Wild Type or Mutant Trpc6 in Mice Is Sufficient to Cause Glomerular Disease", PLos one, 2010, vol. 5, Issue 9, pp. 1-11 (11 pages total).
Wen Chen et al., "Atrial Natriuretic Peptide-Mediated Inhibition of Microcirculatory Endothelial $Ca^{2+}$ and Permeability Response to Histamine Involves cGMP-Dependent Protein Kinase I and TRPC6 Channels", Arterioscler Thromb Vasc Biol, 2013, vol. 33, pp. 2121-2129 (15 pages total).
Mohammad Tauseef et al., "TLR4 activation of TRPC6-dependent calcium signaling mediates endotoxin- induced lung vascular permeability and inflammation", The Journal of Experimental Medicine, 2012, vol. 209, No. 11, pp. 1953-1968 (16 pages total).

\* cited by examiner

BENZIMIDAZOLE DERIVATIVES AND THEIR USES

The present invention relates generally to Transient Receptor Potential Canonical (TRPC) Channel proteins, and more particularly to inhibitors of Transient Receptor Potential Channel 6 (TRPC6) protein activity, pharmaceutical compositions comprising said inhibitors and to methods of using such inhibitors.

BACKGROUND OF THE INVENTION

The TRPC6 channel, a member of the Transient receptor potential (TRP) family, which is a non-selective cation-permeable channel, is activated by diacylglycerol and the like produced by activation of phospholipase C and exerts physiological and pathophysiological effects. TRPC6 has effects such as cardiac pathological hypertrophy and fibrosis, progression of myocardial damage in muscular dystrophy, acute pulmonary vasoconstriction, pathological progression in chronic hypoxia-induced pulmonary hypertension, allergic airway response, migration of cells such as neutrophils, increased permeability of endothelial cells on inflammation, pathological flattening of podocytes and progression of glomerular injury, and proliferation or infiltration of malignant tumors, and is diversely distributed in the brain, heart, lungs, kidneys, placenta, ovaries, spleen, and the like (see for example J. Clin. Invest. 116:3114-3126, 2006; Dev. Cell. 23:705-715, 2012; Circ. Res. 114:823-832, 2014; Proc. Natl. Acd. Sci. USA 103:19093-19098, 2006; J. Cardiovasc. Pharmacol. 57:140-147, 2011; Hypertension 63:173-80, 2014; Clin. Exp. Allergy 38:1548-1558, 2008; Acta. Physiol. 195:3-11, 2009; J. Exp. Med. 209:1953-1968, 2011; Arterioscler. Thromb. Vasc. Biol. 33:2121-2129, 2013; PLoS ONE 5: e12859, 2010; Expert. Opin. Ther. Targets. 14:513-27, 2010; and BMC Cancer 13:116, 2013). In familial focal segmental glomerulosclerosis (FSGS), gain-of-function mutants of TRPC6 have been identified, and in steroid resistant nephrotic syndrome or idiopathic pulmonary arterial hypertension patients, a single nucleotide polymorphism in the promoter region that increases mRNA expression of TRPC6 has been identified (see for example: Pediatr Res. 2013 November; 74(5):511-6 and Circulation. 2009 May 5; 119(17):2313-2322). Thus, it is considered that hyperfunction and increased expression of TRPC6 contribute to pathological progression of nephrotic syndrome, pulmonary hypertension and the like (see for example Science 308:1801-1804, 2005; Nat. Genet. 37:739-744, 2005; PLoS One 4: e7771, 2009; Clin. J. Am. Soc. Nephrol. 6:1139-1148, 2011; Mol. Biol. Cell. 22:1824-1835, 2011; BMC Nephrol. 14:104, 2013; Pediatr. Res. 74:511-516, 2013; and Nephrol. Dial. Transplant. 28:1830-1838, 2013). Furthermore, increased expression of TRPC6 has been reported in minimal change nephrotic syndrome, membranous nephropathy, and diabetic nephropathy (see for example, Circulation 119:2313-2322, 2009; J. Am. Soc. Nephrol. 18:29-36, 2007; and Nephrol. Dial. Transplant. 27:921-929, 2012).

New approaches are needed to modulate TRPC6 activity and more particularly inhibit TRPC6 activity in the prevention and/or treatment of nephrotic syndrome, minimal change disease, focal segmental glomerulosclerosis, collapsing glomerulopathy, membranous nephropathy, membranoproliferative glomerulonephritis, IGA nephropathy, acute renal failure, chronic renal failure, diabetic nephropathy, sepsis, pulmonary hypertension, acute lung disorder, acute respiratory distress syndrome (ARDS) heart failure, stroke, malignant tumor, and muscular dystrophy. There remains a need for agents that exploit different mechanisms of action and may have better outcomes in terms of relief of symptoms, safety, and patient mortality, both short-term and long-term.

SUMMARY OF THE INVENTION

The present invention provides compounds which inhibit TRPC proteins, and more specifically inhibit TRPC6 proteins. The present invention provides, in one aspect, benzimidazole compounds which inhibit TRPC6 activity. Inhibition of TRPC6 activity may be particularly desirable in the treatment or prevention of a variety of diseases including nephrotic syndrome, focal segmental glomerulosclerosis, membranous nephropathy, diabetic nephropathy, heart failure, stroke, acute lung injury, acute respiratory distress syndrome (ARDS) and acute renal failure.

The invention provides, in one aspect, substituted benzimidazole compounds which modulate the activity of TRPC6. Preferably, the substituted benzimidazole compounds of the invention are TRPC6 inhibitors.

Also provided is a pharmaceutical composition comprising a pharmaceutically acceptable excipient, carrier or adjuvant and at least one substituted benzimidazole compound disclosed in the following detailed description. Pharmaceutical compositions provided by the invention are suitable for use in the treatment of disease modulated by TRPC6 activity. In certain aspects the pharmaceutical compositions of the invention are suitable for use in the treatment of, e.g., treatment of nephrotic syndrome, minimal change disease, focal segmental glomerulosclerosis, collapsing glomerulopathy, membranous nephropathy, membranoproliferative glomerulonephritis, IGA nephropathy, acute renal failure, chronic renal failure, diabetic nephropathy, sepsis, pulmonary hypertension, acute lung disorder, heart failure, stroke, malignant tumor or muscular dystrophy.

Also provided is a packaged pharmaceutical composition, comprising a pharmaceutical composition comprising a pharmaceutically acceptable excipient, carrier or adjuvant and at least one substituted benzimidazole compound disclosed in the following detailed description, and instructions for using the composition to treat a patient suffering from a disease mediated by TRPC6 activity or more particularly to treat a patient suffering from nephrotic syndrome, minimal change disease, focal segmental glomerulosclerosis, collapsing glomerulopathy, membranous nephropathy, membranoproliferative glomerulonephritis, IGA nephropathy, acute renal failure, chronic renal failure, diabetic nephropathy, sepsis, pulmonary hypertension, acute lung disorder, acute respiratory distress syndrome (ARDS) heart failure, stroke, malignant tumor or muscular dystrophy. In certain instances, the patient is suffering from nephrotic syndrome, membranous nephropathy, and acute renal failure.

Also provided is a method of treating or preventing disease in a mammal which method comprises administering to a mammal in need thereof a therapeutically effective amount of at least one substituted benzimidazole compound disclosed in the following detailed description or a pharmaceutical composition comprising a pharmaceutically acceptable excipient, carrier or adjuvant and at least one substituted benzimidazole compound disclosed in the following detailed description.

Also provided is a method for modulating TRPC6 activity in a mammal, which method comprises administering to the mammal in need thereof a therapeutically effective amount of at least one substituted benzimidazole compound disclosed in the following detailed description or a pharmaceutical composition comprising a pharmaceutically acceptable excipient, carrier or adjuvant and at least one substituted benzimidazole compound disclosed in the following detailed description. Another aspect of the invention relates to a method of treating a TRPC6-mediated disease or disorder, the method comprising administering a TRPC6 inhibitor of the invention to a patient in need of therapy. In certain embodiments, the TRPC6 mediated disease or disorder is selected from nephrotic syndrome, minimal change disease, focal segmental glomerulosclerosis, collapsing glomerulopathy, membranous nephropathy, membranoproliferative glomerulonephritis, IGA nephropathy, acute renal failure, chronic renal failure, diabetic nephropathy, sepsis, pulmonary hypertension, acute lung disorder, acute respiratory distress syndrome (ARDS), heart failure, stroke, malignant tumor or muscular dystrophy. In certain instances, the patient is suffering from nephrotic syndrome, membranous nephropathy, and acute renal failure.

Also provided is the use, in the manufacture of a medicament for treating or preventing disease mediated by TRPC6 activity, of at least one substituted benzimidazole compound disclosed in the following detailed description.

Other aspects and embodiments will be apparent to those skilled in the art form the following detailed description.

DETAILED DESCRIPTION OF THE INVENTION

The invention related generally to substituted benzimidazole compounds disclosed in the following detailed description and salts and tautomers thereof which inhibit TRPC protein activity and more particularly inhibit TRPC6 protein activity. In particular, the invention relates to compounds which selectively inhibit TRPC6 protein activity.

In a first embodiment, the invention provides a compound or pharmaceutically acceptable salt thereof, selected from the group consisting of
(3R,4R)-4-fluoro-1-(5-fluoro-1-((5-fluoro-2-pyridinyl)methyl)-1H-benzimidazol-2-yl)-3-piperidinamine;
(3R)-1-(5,7-difluoro-1-((5-fluoro-2-pyridinyl)methyl)-1H-benzimidazol-2-yl)-4,4-difluoro-3-piperidinamine;
(3R,4R)-4-fluoro-1-(6-fluoro-1-((5-fluoro-2-pyrimidinyl)methyl)-1H-benzimidazol-2-yl)-3-piperidinamine;
(3R,4R)-4-fluoro-1-(6-fluoro-1-((5-fluoro-2-pyridinyl)methyl)-1H-benzimidazol-2-yl)-3-piperidinamine;
(3R,4R)-1-(1-((5-chloro-2-pyridinyl)methyl)-5-fluoro-1H-benzimidazol-2-yl)-4-fluoro-3-piperidinamine;
(3R)-1-(1-((5-chloro-2-pyrimidinyl)methyl)-6-fluoro-1H-benzimidazol-2-yl)-4,4-difluoro-3-piperidinamine;
(3R)-4,4-difluoro-1-(6-fluoro-1-((5-fluoro-2-pyridinyl)methyl)-1H-benzimidazol-2-yl)-3-piperidinamine;
(3R,4R)-1-(5,6-difluoro-1-((5-methyl-2-pyridinyl)methyl)-1H-benzimidazol-2-yl)-4-fluoro-3-piperidinamine;
(3R,4R)-1-(4,6-difluoro-1-((5-methoxy-2-pyrimidinyl)methyl)-1H-benzimidazol-2-yl)-4-fluoro-3-piperidinamine;
(3R)-1-(1-((5-chloropyridin-2-yl)methyl)-6-fluoro-1H-benzimidazol-2-yl)-4,4-difluoropiperidin-3-amine;
(3R,4R)-4-fluoro-1-(5-fluoro-1-((5-fluoro-2-pyrimidinyl)methyl)-1H-benzimidazol-2-yl)-3-piperidinamine;
(3R,4R)-1-(1-((5-chloro-2-pyridinyl)methyl)-6-fluoro-1H-benzimidazol-2-yl)-4-fluoro-3-piperidinamine;
2-((3R)-3-amino-4,4-difluoro-1-piperidinyl)-1-((5-chloro-2-pyridinyl)methyl)-1H-benzimidazole-6-carbonitrile;
(3R)-1-(1-((5-chloro-2-pyrimidinyl)methyl)-4,6-difluoro-1H-benzimidazol-2-yl)-4,4-difluoro-3-piperidinamine;
2-((3R,4R)-3-amino-4-fluoro-1-piperidinyl)-6-fluoro-1-((5-fluoro-2-pyridinyl)methyl)-1H-benzimidazole-4-carbonitrile;
(3R)-1-(1-((5-chloro-2-pyridinyl)methyl)-5,6-difluoro-1H-benzimidazol-2-yl)-4,4-difluoro-3-piperidinamine;
(3R)-1-(1-((5-chloro-2-pyrimidinyl)methyl)-5,6-difluoro-1H-benzimidazol-2-yl)-4,4-difluoro-3-piperidinamine;
(3R,4R)-1-(1-((5-chloro-2-pyrimidinyl)methyl)-5,6-difluoro-1H-benzimidazol-2-yl)-4-fluoro-3-piperidinamine;
(3R,4R)-1-(5,6-difluoro-1-((5-methoxy-2-pyrimidinyl)methyl)-1H-benzimidazol-2-yl)-4-fluoro-3-piperidinamine;
6-((2-((3R,4R)-3-amino-4-fluoro-1-piperidinyl)-5,6-difluoro-1H-benzimidazol-1-yl)methyl)-2-pyridinecarbonitrile; and
(3R,4R)-1-(1-((5-chloropyrimidin-2-yl)methyl)-4-fluoro-6-methoxy-1H-benzimidazol-2-yl)-4-fluoropiperidin-3-amine.

In a second embodiment, a compound of the first embodiment is provided which is selected from the group consisting of:
(3R,4R)-4-fluoro-1-(5-fluoro-1-((5-fluoro-2-pyridinyl)methyl)-1H-benzimidazol-2-yl)-3-piperidinamine;
(3R)-1-(5,7-difluoro-1-((5-fluoro-2-pyridinyl)methyl)-1H-benzimidazol-2-yl)-4,4-difluoro-3-piperidinamine;
(3R,4R)-4-fluoro-1-(6-fluoro-1-((5-fluoro-2-pyrimidinyl)methyl)-1H-benzimidazol-2-yl)-3-piperidinamine;
(3R,4R)-4-fluoro-1-(6-fluoro-1-((5-fluoro-2-pyridinyl)methyl)-1H-benzimidazol-2-yl)-3-piperidinamine; and
(3R,4R)-1-(1-((5-chloro-2-pyridinyl)methyl)-5-fluoro-1H-benzimidazol-2-yl)-4-fluoro-3-piperidinamine, or a pharmaceutically acceptable salt thereof.

In a third embodiment, a compound of the first embodiment is provided which is selected from the group consisting of
(3R)-1-(1-((5-chloro-2-pyrimidinyl)methyl)-6-fluoro-1H-benzimidazol-2-yl)-4,4-difluoro-3-piperidinamine;
(3R)-4,4-difluoro-1-(6-fluoro-1-((5-fluoro-2-pyridinyl)methyl)-1H-benzimidazol-2-yl)-3-piperidinamine;
(3R,4R)-1-(5,6-difluoro-1-((5-methyl-2-pyridinyl)methyl)-1H-benzimidazol-2-yl)-4-fluoro-3-piperidinamine;
(3R,4R)-1-(4,6-difluoro-1-((5-methoxy-2-pyrimidinyl)methyl)-1H-benzimidazol-2-yl)-4-fluoro-3-piperidinamine; and
(3R)-1-(1-((5-chloropyridin-2-yl)methyl)-6-fluoro-1H-benzimidazol-2-yl)-4,4-difluoropiperidin-3-amine, or a pharmaceutically acceptable salt thereof.

In a fourth embodiment, a compound of the first embodiment is provided which is selected from the group consisting of:
(3R,4R)-4-fluoro-1-(5-fluoro-1-((5-fluoro-2-pyrimidinyl)methyl)-1H-benzimidazol-2-yl)-3-piperidinamine;
(3R,4R)-1-(1-((5-chloro-2-pyridinyl)methyl)-6-fluoro-1H-benzimidazol-2-yl)-4-fluoro-3-piperidinamine;
2-((3R)-3-amino-4,4-difluoro-1-piperidinyl)-1-((5-chloro-2-pyridinyl)methyl)-1H-benzimidazole-6-carbonitrile;
(3R)-1-(1-((5-chloro-2-pyrimidinyl)methyl)-4,6-difluoro-1H-benzimidazol-2-yl)-4,4-difluoro-3-piperidinamine; and
2-((3R,4R)-3-amino-4-fluoro-1-piperidinyl)-6-fluoro-1-((5-fluoro-2-pyridinyl)methyl)-1H-benzimidazole-4-carbonitrile, or a pharmaceutically acceptable salt thereof.

In a fifth embodiment, a compound of the first embodiment is provided which is selected from the group consisting of:
(3R)-1-(1-((5-chloro-2-pyridinyl)methyl)-5,6-difluoro-1H-benzimidazol-2-yl)-4,4-difluoro-3-piperidinamine;

(3R)-1-(1-((5-chloro-2-pyrimidinyl)methyl)-5,6-difluoro-1H-benzimidazol-2-yl)-4,4-difluoro-3-piperidinamine;

(3R,4R)-1-(1-((5-chloro-2-pyrimidinyl)methyl)-5,6-difluoro-1H-benzimidazol-2-yl)-4-fluoro-3-piperidinamine;

(3R,4R)-1-(5,6-difluoro-1-((5-methoxy-2-pyrimidinyl)methyl)-1H-benzimidazol-2-yl)-4-fluoro-3-piperidinamine;

6-((2-((3R,4R)-3-amino-4-fluoro-1-piperidinyl)-5,6-difluoro-1H-benzimidazol-1-yl)methyl)-2-pyridinecarbonitrile; and (3R,4R)-1-(1-((5-chloropyrimidin-2-yl)methyl)-4-fluoro-6-methoxy-1H-benzimidazol-2-yl)-4-fluoropiperidin-3-amine, or a pharmaceutically acceptable salt thereof.

In a further embodiment, each of the compounds disclosed herein are provided in the form of a pharmaceutically acceptable salt.

In a sixth embodiment, compounds and pharmaceutically acceptable salts thereof provided in each of the first to fifth embodiment may be used in the preparation of a medicament for use in treating a disease mediated by TRPC6 activity. In certain aspects, the compounds provided in the first to fifth embodiment, or pharmaceutically acceptable salt thereof, may be used in the manufacture of a medicament for the treatment of a disease or disorder selected from nephrotic syndrome, minimal change disease, focal segmental glomerulosclerosis, collapsing glomerulopathy, membranous nephropathy, membranoproliferative glomerulonephritis, IGA nephropathy, acute renal failure, chronic renal failure, diabetic nephropathy, sepsis, pulmonary hypertension, acute lung disorder, acute respiratory distress syndrome (ARDS), heart failure, stroke, malignant tumor or muscular dystrophy. In still other aspects, the compounds of the first to fifth embodiment, or pharmaceutically acceptable salt thereof may be used in the preparation of a medicament for the treatment of nephrotic syndrome, membranous nephropathy and acute renal failure.

In a seventh embodiment, a method of treating disease or disorder in a patient in need of therapy is provided, the method comprises the step of administering a pharmaceutically acceptable composition comprising a compound of any one of the first to fifth embodiments, or a pharmaceutically acceptable salt thereof, wherein the disease or disorder is selected from nephrotic syndrome, minimal change disease, focal segmental glomerulosclerosis, collapsing glomerulopathy, membranous nephropathy, membranoproliferative glomerulonephritis, IGA nephropathy, acute renal failure, chronic renal failure, diabetic nephropathy, sepsis, pulmonary hypertension, acute lung disorder, acute respiratory distress syndrome (ARDS), heart failure, stroke, malignant tumor or muscular dystrophy. In certain aspects of the sixth embodiment the disease or disorder is selected from nephrotic syndrome, membranous nephropathy and acute renal failure.

In another embodiment, pharmaceutical compositions are provided which comprise one or more pharmaceutically acceptable carriers and a therapeutically effective amount of a compound of any one of the first to fifth embodiment. In some aspects, the composition is formulated in a form selected from the group consisting of an injectable fluid, an aerosol, a tablet, a pill, a capsule, a syrup, a cream, a gel and a transdermal patch.

In another embodiment, combinations, in particular pharmaceutical combinations, are provided which comprise a therapeutically effective amount of the compound of any one of the first to fifth embodiment.

In another embodiment, methods of modulating TRPC protein activity in a subject are provided which methods comprise administering to the subject a therapeutically effective amount of compound of any one of the first to fifth embodiment. In preferred aspects of the embodiment, methods of inhibiting TRPC6 activity in a subject are provided, which methods comprise administering to the subject a therapeutically effective amount of a compound of any one of the first to fifth embodiment. In certain aspects of the embodiment, method of inhibiting TRPC6 activity in a subject are provided, which methods comprise administering to the subject a therapeutically effective amount of a compound of any one of the first to fifth embodiment.

In yet other embodiments, methods of treating a disorder or a disease in a subject mediated by TRPC protein activity are provided, in particular methods of treating a disease or disorder mediated by TRPC6 protein activity are provided. The methods comprise administering to the subject a therapeutically effective amount of the compound of any one of the first to fifth embodiment.

In another embodiment, methods of treating or preventing a disease or disorder are provided where the disease or disorder is selected from nephrotic syndrome, minimal change disease, focal segmental glomerulosclerosis, collapsing glomerulopathy, membranous nephropathy, membranoproliferative glomerulonephritis, IGA nephropathy, acute renal failure, chronic renal failure, diabetic nephropathy, sepsis, pulmonary hypertension, acute lung disorder, acute respiratory distress syndrome (ARDS), heart failure, stroke, malignant tumor or muscular dystrophy which method comprises the step of administering to a subject in need of therapy a therapeutically effective amount of a compound of any one of the first to fifth embodiment. In certain aspects of this embodiment, the method comprises treating a disease or disorder selected from nephrotic syndrome, minimal change disease, focal segmental glomerulosclerosis, collapsing glomerulopathy, membranous nephropathy, membranoproliferative glomerulonephritis, IGA nephropathy, acute renal failure, chronic renal failure, diabetic nephropathy, sepsis, pulmonary hypertension, acute lung disorder, acute respiratory distress syndrome (ARDS), heart failure, stroke, malignant tumor or muscular dystrophy. In certain instances, the treatment methods and/or the prevention methods are suitable for the treatment and or prevention nephrotic syndrome, membranous nephropathy, and acute renal failure.

In another aspect, the invention provides a compound of any one of the first to fifth embodiment for use in the preparation of a medicament or for use in the manufacture of a medicament for the treatment of a disorder or disease in a subject mediated by TRPC protein activity. In certain other aspects, the invention provides for the use of a compound of any one of the first to fifth embodiment in the treatment of nephrotic syndrome, minimal change disease, focal segmental glomerulosclerosis, collapsing glomerulopathy, membranous nephropathy, membranoproliferative glomerulonephritis, IGA nephropathy, acute renal failure, chronic renal failure, diabetic nephropathy, sepsis, pulmonary hypertension, acute lung disorder, acute respiratory distress syndrome (ARDS), heart failure, stroke, malignant tumor or muscular dystrophy. In certain instances, the invention provides a compound of any one of the first to fifth embodiment for use in the preparation of a medicament or for use in the manufacture of a medicament or the treatment of a disease or disorder in a subject selected from nephrotic syndrome, membranous nephropathy, and acute renal failure.

For purposes of interpreting this specification, the following definitions will apply and whenever appropriate, terms used in the singular will also include the plural and vice versa.

As used herein, the term "isomers" refers to different compounds that have the same molecular formula but differ in arrangement and configuration of the atoms. Also as used herein, the term "an optical isomer" or "a stereoisomer" refers to any of the various stereo isomeric configurations which may exist for a given compound of the present invention and includes geometric isomers. It is understood that a substituent may be attached at a chiral center of a carbon atom. Therefore, the invention includes enantiomers, diastereomers or racemates of the compound. "Enantiomers" are a pair of stereoisomers that are non-superimposable mirror images of each other. A 1:1 mixture of a pair of enantiomers is a "racemic" mixture. The term is used to designate a racemic mixture where appropriate. The use of "rel" indicates that the diastereomeric orientation is known but the absolute stereochemistry is not. In cases where the absolute stereochemistry has not been determined the optical rotation and/or chiral chromatography conditions will indicate which isomer is present.

"Diastereoisomers" are stereoisomers that have at least two asymmetric atoms, but which are not mirror-images of each other. The absolute stereochemistry is specified according to the Cahn-Ingold-Prelog R-S system. When a compound is a pure enantiomer the stereochemistry at each chiral carbon may be specified by either R or S. Resolved compounds whose absolute configuration is unknown can be designated (+) or (−) depending on the direction (dextro- or levorotatory) which they rotate plane polarized light at the wavelength of the sodium D line or retention time on chiral chromatography separation. Certain of the compounds described herein contain one or more asymmetric centers or axes and may thus give rise to enantiomers, diastereomers, and other stereoisomeric forms that may be defined, in terms of absolute stereochemistry, as (R)- or (S)-, or with the (+) or (−) sign. The present invention is meant to include all such possible isomers, including racemic mixtures, optically pure forms and intermediate mixtures. Optically active (R)- and (S)-isomers may be prepared using chiral synthons or chiral reagents, or resolved using conventional techniques. If the compound contains a double bond, the substituent may be E or Z configuration. If the compound contains a disubstituted cycloalkyl, the cycloalkyl substituent may have a cis- or trans-configuration.

It is understood that for any compound provided herein, including any compound of any of the first to fifth embodiment or a salt of any of the foregoing, the compound may exist in any stereochemical form, such as a single enantiomer, diastereomer, or tautomer or a mixture of one or more enantiomers, diastereomers, and tautomers in any ratio.

As used herein, the terms "salt" or "salts" refers to an acid addition or base addition salt of a compound of the invention. "Salts" include in particular "pharmaceutical acceptable salts". The term "pharmaceutically acceptable salts" refers to salts that retain the biological effectiveness and properties of the compounds of this invention and, which typically are not biologically or otherwise undesirable. In many cases, the compounds of the present invention are capable of forming acid and/or base salts by virtue of the presence of amino and/or carboxyl groups or groups similar thereto.

Pharmaceutically acceptable acid addition salts can be formed with inorganic acids and organic acids.

Inorganic acids from which salts can be derived include, for example, hydrochloric acid, hydrobromic acid, sulfuric acid, nitric acid, phosphoric acid, and the like.

Organic acids from which salts can be derived include, for example, acetic acid, propionic acid, glycolic acid, oxalic acid, maleic acid, malonic acid, succinic acid, fumaric acid, tartaric acid, citric acid, benzoic acid, mandelic acid, methanesulfonic acid, ethanesulfonic acid, benzenesulfonic acid, toluenesulfonic acid, sulfosalicylic acid, and the like.

Pharmaceutically acceptable base addition salts can be formed with inorganic and organic bases.

Inorganic bases from which salts can be derived include, for example, ammonium salts and metals from columns I to XII of the periodic table. In certain embodiments, the salts are derived from sodium, potassium, ammonium, calcium, magnesium, iron, silver, zinc, and copper. In certain other embodiments, the salts are selected from ammonium, potassium, sodium, calcium and magnesium salts.

Organic bases from which salts can be derived include, for example, primary, secondary, and tertiary amines, substituted amines including naturally occurring substituted amines, cyclic amines, basic ion exchange resins, and the like. Certain organic amines include isopropylamine, benzathine, cholinate, diethanolamine, diethylamine, lysine, meglumine, piperazine and tromethamine.

In another aspect, the present invention provides compounds as disclosed herein in acetate, ascorbate, adipate, aspartate, benzoate, besylate, bromide/hydrobromide, bicarbonate/carbonate, bisulfate/sulfate, camphorsulfonate, caprate, chloride/hydrochloride, chlortheophyllonate, citrate, ethandisulfonate, fumarate, gluceptate, gluconate, glucuronate, glutamate, glutarate, glycolate, hippurate, hydroiodide/iodide, isethionate, lactate, lactobionate, laurylsulfate, malate, maleate, malonate, mandelate, mesylate, methylsulphate, mucate, naphthoate, napsylate, nicotinate, nitrate, octadecanoate, oleate, oxalate, palmitate, pamoate, phosphate/hydrogen phosphate/dihydrogen phosphate, polygalacturonate, propionate, sebacate, stearate, succinate, sulfosalicylate, sulfate, tartrate, tosylate trifenatate, trifluoroacetate or xinafoate salt form. In yet another aspect, the present invention provides compounds as disclosed herein in $C_1$-$C_4$alkyl sulfonic acid, benzenesulfonic acid or mono-, di- or tri-$C_1$-$C_4$alkyl substituted benzene sulfonic acid addition salt form.

Any formula or compound given herein is also intended to represent unlabeled forms as well as isotopically labeled forms of the compounds. Isotopically labeled compounds have structures depicted by the compounds or formulas given herein except that one or more atoms are replaced by an atom having a selected atomic mass or mass number. Examples of isotopes that can be incorporated into compounds of the invention include isotopes of hydrogen, carbon, nitrogen, oxygen, phosphorous, fluorine, and chlorine, such as $^2H$, $^3H$, $^{11}C$, $^{13}C$, $^{14}C$, $^{15}N$, $^{18}F$ $^{31}P$, $^{32}P$, $^{35}S$, $^{36}Cl$, $^{124}I$, $^{125}I$ respectively. The invention includes various isotopically labeled compounds as defined herein, for example those into which radioactive isotopes, such as $^3H$, $^{13}C$, and $^{14}C$, are present. Such isotopically labelled compounds are useful in metabolic studies (with $^{14}C$), reaction kinetic studies (with, for example $^2H$ or $^3H$), detection or imaging techniques, such as positron emission tomography (PET) or single-photon emission computed tomography (SPECT) including drug or substrate tissue distribution assays, or in radioactive treatment of patients. In particular, an $^{18}F$ or labeled compound may be particularly desirable for PET or SPECT studies. Isotopically labeled compounds of this invention and salts thereof can generally be prepared by carrying out the procedures disclosed in the schemes or in the examples and preparations described below by substituting a readily available isotopically labeled reagent for a non-isotopically labeled reagent.

Further, substitution with heavier isotopes, particularly deuterium (i.e., $^2$H or D) may afford certain therapeutic advantages resulting from greater metabolic stability, for example increased in vivo half-life or reduced dosage requirements or an improvement in therapeutic index. It is understood that deuterium in this context is regarded as a substituent of a compound of the first embodiment of the invention. The concentration of such a heavier isotope, specifically deuterium, may be defined by the isotopic enrichment factor. The term "isotopic enrichment factor" as used herein means the ratio between the isotopic abundance and the natural abundance of a specified isotope. If a substituent in a compound of this invention is denoted deuterium, such compound has at least 50% deuterium incorporation at each designated deuterium atom, 60% deuterium incorporation, at least 75% deuterium incorporation, at least 90% deuterium incorporation, at least 95% deuterium incorporation, at least 99% deuterium incorporation, or at least 99.5% deuterium incorporation.

The compounds of the present invention may inherently or by design form solvates with solvents (including water). Therefore, it is intended that the invention embrace both solvated and unsolvated forms. The term "solvate" refers to a molecular complex of a compound of the present invention (including salts thereof) with one or more solvent molecules. Such solvent molecules are those commonly used in the pharmaceutical art, which are known to be innocuous to a recipient, e.g., water, ethanol, dimethylsulfoxide, acetone and other common organic solvents. The term "hydrate" refers to a molecular complex comprising a compound of the invention and water. Pharmaceutically acceptable solvates in accordance with the invention include those wherein the solvent of crystallization may be isotopically substituted, e.g. $D_2O$, $d_6$-acetone, $d_6$-DMSO.

The term "a therapeutically effective amount" of a compound of the present invention refers to an amount of the compound of the present invention that will elicit the biological or medical response of a subject, for example, reduction or inhibition of an enzyme or a protein activity, or ameliorate symptoms, alleviate conditions, slow or delay disease progression, or prevent a disease, etc. In one non-limiting embodiment, the term "a therapeutically effective amount" refers to the amount of the compound of the present invention that, when administered to a subject, is effective to (1) at least partially alleviating, inhibiting, preventing and/or ameliorating a condition, or a disorder, or a disease or biological process (i) mediated by TRPC6 activity, or (ii) associated with TRPC6 activity; or (2) inhibiting the activity of TRPC6. In another non-limiting embodiment, the term "a therapeutically effective amount" refers to the amount of the compound of the present invention that, when administered to a cell, or a tissue, or a non-cellular biological material, or a medium, is effective to at least partially inhibit TRPC6 activity.

As used herein, the term "subject" refers to an animal. Typically the animal is a mammal. A subject also refers to for example, primates (e.g., humans), cows, sheep, goats, horses, dogs, cats, rabbits, rats, mice, fish, birds and the like. In certain embodiments, the subject is a primate. In yet other embodiments, the subject is a human.

As used herein, the term "inhibit", "inhibition" or "inhibiting" refers to the reduction or suppression of a given condition, symptom, or disorder, or disease, or a significant decrease in the baseline activity of a biological activity or process.

As used herein, the term "treat", "treating" or "treatment" of any disease or disorder refers in one embodiment, to ameliorating the disease or disorder (i.e., slowing or arresting or reducing the development of the disease or at least one of the clinical symptoms thereof). In another embodiment "treat", "treating" or "treatment" refers to alleviating or ameliorating at least one physical parameter including those which may not be discernible by the patient. In yet another embodiment, "treat", "treating" or "treatment" refers to modulating the disease or disorder, either physically, (e.g., stabilization of a discernible symptom), physiologically, (e.g., stabilization of a physical parameter), or both.

As used herein, the term "prevent," "preventing" or "prevention" of any disease or disorder refers in one embodiment, to delay or avoidance of onset of the disease or disorder (i.e., slowing or preventing the onset of the disease or disorder in a patient susceptible to development of the disease or disorder).

As used herein, a subject is "in need of" a treatment if such subject would benefit biologically, medically or in quality of life from such treatment.

As used herein, the term "a," "an," "the" and similar terms used in the context of the present invention (especially in the context of the claims) are to be construed to cover both the singular and plural unless otherwise indicated herein or clearly contradicted by the context.

Any asymmetric atom (e.g., carbon or the like) of the compound(s) of the present invention can be present in racemic or enantiomerically enriched, for example the (R)-, (S)- or (R,S)-configuration. In certain embodiments, each asymmetric atom has at least 50% enantiomeric excess, at least 60% enantiomeric excess, at least 70% enantiomeric excess, at least 80% enantiomeric excess, at least 90% enantiomeric excess, at least 95% enantiomeric excess, or at least 99% enantiomeric excess in the (R)- or (S)-configuration. Substituents at atoms with unsaturated bonds may, if possible, be present in cis-(Z)- or trans-(E)-form.

Accordingly, as used herein a compound of the present invention can be in the form of one of the possible isomers, rotamers, atropisomers, tautomers or mixtures thereof, for example, as substantially pure geometric (cis or trans) isomers, diastereomers, optical isomers (antipodes), racemates or mixtures thereof.

Any resulting mixtures of isomers can be separated on the basis of the physicochemical differences of the constituents, into the pure or substantially pure geometric or optical isomers, diastereomers, racemates, for example, by chromatography and/or fractional crystallization.

Any resulting racemates of final products or intermediates can be resolved into the optical antipodes by known methods, e.g., by separation of the diastereomeric salts thereof, obtained with an optically active acid or base, and liberating the optically active acidic or basic compound. In particular, a basic moiety may thus be employed to resolve the compounds of the present invention into their optical antipodes, e.g., by fractional crystallization of a salt formed with an optically active acid, e.g., tartaric acid, dibenzoyl tartaric acid, diacetyl tartaric acid, di-O,O'-p-toluoyl tartaric acid, mandelic acid, malic acid or camphor-10-sulfonic acid. Racemic products can also be resolved by chiral chromatography, e.g., high performance liquid chromatography (HPLC) or supercritical fluid chromatography (SFC) using a chiral adsorbent.

Mixtures of isomers obtainable according to the invention can be separated in a manner known to those skilled in the art into the individual isomers; diastereoisomers can be separated, for example, by partitioning between polyphasic solvent mixtures, recrystallization and/or chromatographic separation, for example over silica gel or by e.g. medium pressure liquid chromatography over a reversed phase column, and racemates can be separated, for example, by the formation of salts with optically pure salt-forming reagents and separation of the mixture of diastereoisomers so obtainable, for example by means of fractional crystallization, or by chromatography over optically active column materials.

Within the scope of this text, only a readily removable group that is not a constituent of the particular desired end product of the compounds of the present invention is designated a "protecting group", unless the context indicates otherwise. The protection of functional groups by such protecting groups, the protecting groups themselves, and their cleavage reactions are described for example in standard reference works, such as J. F. W. McOmie, "Protective Groups in Organic Chemistry", Plenum Press, London and New York 1973, in T. W. Greene and P. G. M. Wuts, "Protective Groups in Organic Synthesis", Third edition, Wiley, New York 1999, in "The Peptides"; Volume 3 (editors: E. Gross and J. Meienhofer), Academic Press, London and New York 1981, in "Methoden der organischen Chemie" (Methods of Organic Chemistry), Houben Weyl, 4th edition, Volume 15/I, Georg Thieme Verlag, Stuttgart 1974, in H.-D. Jakubke and H. Jeschkeit, "Aminosauren, Peptide, Proteine" (Amino acids, Peptides, Proteins), Verlag Chemie, Weinheim, Deerfield Beach, and Basel 1982, and in Jochen Lehmann, "Chemie der Kohlenhydrate: Monosaccharide and Derivate" (Chemistry of Carbohydrates: Monosaccharides and Derivatives), Georg Thieme Verlag, Stuttgart 1974. A characteristic of protecting groups is that they can be removed readily (i.e. without the occurrence of undesired secondary reactions) for example by solvolysis, reduction, photolysis or alternatively under physiological conditions (e.g. by enzymatic cleavage).

Intermediates and final products can be worked up and/or purified according to standard methods, e.g. using chromatographic methods, distribution methods, (re-) crystallization, and the like.

All methods described herein can be performed in any suitable order unless otherwise indicated herein or otherwise clearly contradicted by context. The use of any and all examples, or exemplary language (e.g. "such as") provided herein is intended merely to better illuminate the invention and does not pose a limitation on the scope of the invention otherwise claimed.

Any process steps disclosed herein can be carried out under reaction conditions that are known to those skilled in the art, including those mentioned specifically, in the absence or, customarily, in the presence of solvents or diluents, including, for example, solvents or diluents that are inert towards the reagents used and dissolve them, in the absence or presence of catalysts, condensation or neutralizing agents, for example ion exchangers, such as cation exchangers, e.g. in the $H^+$ form, depending on the nature of the reaction and/or of the reactants at reduced, normal or elevated temperature, for example in a temperature range of from about −100° C. to about 250° C., including, for example, from approximately −80° C. to approximately 250° C., for example at from −80 to −60° C., at room temperature, at from −20 to 40° C. or at reflux temperature, under atmospheric pressure or in a closed vessel, where appropriate under pressure, and/or in an inert atmosphere, for example under an argon or nitrogen atmosphere.

The solvents from which those solvents that are suitable for any particular reaction may be selected include those mentioned specifically or, for example, water, esters, such as lower alkyl-lower alkanoates, for example ethyl acetate, ethers, such as aliphatic ethers, for example diethyl ether, or cyclic ethers, for example tetrahydrofuran or dioxane, liquid aromatic hydrocarbons, such as benzene or toluene, alcohols, such as methanol, ethanol or 1 or 2-propanol, nitriles, such as acetonitrile, halogenated hydrocarbons, such as methylene chloride or chloroform, acid amides, such as dimethylformamide or dimethyl acetamide, bases, such as heterocyclic nitrogen bases, for example pyridine or N-methylpyrrolidin-2-one, carboxylic acid anhydrides, such as lower alkanoic acid anhydrides, for example acetic anhydride, cyclic, linear or branched hydrocarbons, such as cyclohexane, hexane or isopentane, methycyclohexane, or mixtures of those solvents, for example aqueous solutions, unless otherwise indicated in the description of the processes. Such solvent mixtures may also be used in working up, for example by chromatography or partitioning.

In another aspect, the present invention provides a pharmaceutical composition comprising a compound of the present invention, or a pharmaceutically acceptable salt thereof, and a pharmaceutically acceptable carrier. In a further embodiment, the composition comprises at least two pharmaceutically acceptable carriers, such as those described herein. For purposes of the present invention, unless designated otherwise, solvates and hydrates are generally considered compositions. Preferably, pharmaceutically acceptable carriers are sterile. The pharmaceutical composition can be formulated for particular routes of administration such as oral administration, parenteral administration, and rectal administration, etc. In addition, the pharmaceutical compositions of the present invention can be made up in a solid form (including without limitation capsules, tablets, pills, granules, powders or suppositories), or in a liquid form (including without limitation solutions, suspensions or emulsions). The pharmaceutical compositions can be subjected to conventional pharmaceutical operations such as sterilization and/or can contain conventional inert diluents, lubricating agents, or buffering agents, as well as adjuvants, such as preservatives, stabilizers, wetting agents, emulsifiers and buffers, etc.

As used herein, the term "pharmaceutically acceptable carrier" includes any and all solvents, dispersion media, coatings, surfactants, antioxidants, preservatives (e.g., antibacterial agents, antifungal agents), isotonic agents, absorption delaying agents, salts, preservatives, drugs, drug stabilizers, binders, excipients, disintegration agents, lubricants, sweetening agents, flavoring agents, dyes, and the like and combinations thereof, as would be known to those skilled in the art (see, for example, Remington's Pharmaceutical Sciences, 18th Ed. Mack Printing Company, 1990, pp. 1289-1329). Except insofar as any conventional carrier is incompatible with the active ingredient, its use in the therapeutic or pharmaceutical compositions is contemplated.

Typically, the pharmaceutical compositions are tablets or gelatin capsules comprising the active ingredient together with one or more of: a) diluents, e.g., lactose, dextrose, sucrose, mannitol, sorbitol, cellulose and/or glycine; b) lubricants, e.g., silica, talcum, stearic acid, its magnesium or calcium salt and/or polyethyleneglycol; for tablets also c) binders, e.g., magnesium aluminum silicate, starch paste, gelatin, tragacanth, methylcellulose, sodium carboxymethylcellulose and/or polyvinylpyrrolidone; if desired d) disintegrants, e.g., starches, agar, alginic acid or its sodium salt, or effervescent mixtures; and e) absorbents, colorants, flavors and sweeteners. Tablets may be either film coated or enteric coated according to methods known in the art. Suitable compositions for oral administration include an effective amount of a compound of the invention in the form of tablets, lozenges, aqueous or oily suspensions, dispersible powders or granules, emulsion, hard or soft capsules, or syrups or elixirs. Compositions intended for oral use are prepared according to any method known in the art for the manufacture of pharmaceutical compositions and such compositions can contain one or more agents selected from the group consisting of sweetening agents, flavoring agents, coloring agents and preserving agents in order to provide pharmaceutically elegant and palatable preparations. Tablets may contain the active ingredient in admixture with nontoxic pharmaceutically acceptable excipients which are suitable for the manufacture of tablets. These excipients are, for example, inert diluents, such as calcium carbonate, sodium carbonate, lactose, calcium phosphate or sodium phosphate; granulating and disintegrating agents, for example, corn starch, or alginic acid; binding agents, for example, starch, gelatin or acacia; and lubricating agents, for example magnesium stearate, stearic acid or talc. The tablets are uncoated or coated by known techniques to delay disintegration and absorption in the gastrointestinal tract and thereby provide a sustained action over a longer period. For example, a time delay material such as glyceryl monostearate or glyceryl distearate can be employed. Formulations for oral use can be presented as hard gelatin capsules wherein the active ingredient is mixed with an inert solid diluent, for example, calcium carbonate, calcium phosphate or kaolin, or as soft gelatin capsules wherein the active ingredient is mixed with water or an oil medium, for example, peanut oil, liquid paraffin or olive oil. Certain injectable compositions are aqueous isotonic solutions or suspensions, and suppositories are advantageously prepared from fatty emulsions or suspensions. Said compositions may be sterilized and/or contain adjuvants, such as preserving, stabilizing, wetting or emulsifying agents, solution promoters, salts for regulating the osmotic pressure and/or buffers. In addition, they may also contain other therapeutically valuable substances. Said compositions are prepared according to conventional mixing, granulating or coating methods, respectively, and contain about 0.1-75%, or contain about 1-50%, of the active ingredient. Suitable compositions for transdermal application include an effective amount of a compound of the invention with a suitable carrier. Carriers suitable for transdermal delivery include absorbable pharmacologically acceptable solvents to assist passage through the skin of the host. For example, transdermal devices are in the form of a bandage comprising a backing member, a reservoir containing the compound optionally with carriers, optionally a rate controlling barrier to deliver the compound of the skin of the host at a controlled and predetermined rate over a prolonged period of time, and means to secure the device to the skin. Suitable compositions for topical application, e.g., to the skin and eyes, include aqueous solutions, suspensions, ointments, creams, gels or sprayable formulations, e.g., for delivery by aerosol or the like. Such topical delivery systems will in particular be appropriate for dermal application, e.g., for the treatment of skin cancer, e.g., for prophylactic use in sun creams, lotions, sprays and the like. They are thus particularly suited for use in topical, including cosmetic, formulations well-known in the art. Such may contain solubilizers, stabilizers, tonicity enhancing agents, buffers and preservatives. As used herein a topical application may also pertain to an inhalation or to an intranasal application. They may be conveniently delivered in the form of a dry powder (either alone, as a mixture, for example a dry blend with lactose, or a mixed component particle, for example with phospholipids) from a dry powder inhaler or an aerosol spray presentation from a pressurized container, pump, spray, atomizer or nebulizer, with or without the use of a suitable propellant.

The present invention further provides anhydrous pharmaceutical compositions and dosage forms comprising the compounds of the present invention as active ingredients, since water may facilitate the degradation of certain compounds.

Anhydrous pharmaceutical compositions and dosage forms of the invention can be prepared using anhydrous or low moisture containing ingredients and low moisture or low humidity conditions. An anhydrous pharmaceutical composition may be prepared and stored such that its anhydrous nature is maintained. Accordingly, anhydrous compositions are packaged using materials known to prevent exposure to water such that they can be included in suitable formulary kits. Examples of suitable packaging include, but are not limited to, hermetically sealed foils, plastics, unit dose containers (e.g., vials), blister packs, and strip packs.

The invention further provides pharmaceutical compositions and dosage forms that comprise one or more agents that reduce the rate by which the compound of the present invention as an active ingredient will decompose. Such agents, which are referred to herein as "stabilizers," include, but are not limited to, antioxidants such as ascorbic acid, pH buffers, or salt buffers, etc.

Prophylactic and Therapeutic Uses

The compounds disclosed herein in free form or in pharmaceutically acceptable salt form, exhibit valuable pharmacological properties, e.g. TRPC protein modulating properties and more particularly inhibition of TRPC6 protein activity, e.g. as indicated in in vitro and in vivo tests as provided in the next sections and are therefore indicated for therapy.

The present invention provides methods of treating a disease or disorder associated with TRPC6 protein activity by administering to a subject in need thereof an effective amount of a compound disclosed herein. In certain aspects, the disease or disorder suitable for therapy by administration of the compound of the invention include, but are not limited to, nephrotic syndrome, minimal change disease, focal segmental glomerulosclerosis, collapsing glomerulopathy, membranous nephropathy, membranoproliferative glomerulonephritis, IGA nephropathy, acute renal failure, chronic renal failure, diabetic nephropathy, sepsis, pulmonary hypertension, acute lung disorder, acute respiratory distress syndrome (ARDS), heart failure, stroke, malignant tumor or muscular dystrophy. In certain instances, the patient is suffering from nephrotic syndrome, membranous nephropathy, and acute renal failure.

In a specific embodiment, the present invention provides a method of treating or preventing renal disease by administering to a subject in need thereof an effective amount of a compound disclosed herein. In certain embodiments, patients who are currently asymptomatic but are at risk of developing renal disease are suitable for administration with a compound of the invention. The methods of treating or preventing renal disease include, but are not limited to, methods of treating or preventing nephrotic syndrome, membranous nephropathy, acute renal failure, sepsis, chronic renal failure and diabetic nephropathy.

The pharmaceutical composition or combination of the present invention can be in unit dosage of about 1-1000 mg of active ingredient(s) for a subject of about 50-70 kg, or about 1-500 mg or about 1-250 mg or about 1-150 mg or about 0.5-100 mg, or about 1-50 mg of active ingredients.

The therapeutically effective dosage of a compound, the pharmaceutical composition, or the combinations thereof, is dependent on the species of the subject, the body weight, age and individual condition, the disorder or disease or the severity thereof being treated. A physician, clinician or veterinarian of ordinary skill can determine the effective amount of each of the active ingredients necessary to prevent, treat or inhibit the progress of the disorder or disease.

The above-cited dosage properties are demonstrable in vitro and in vivo tests using advantageously mammals, e.g., mice, rats, dogs, monkeys or isolated organs, tissues and preparations thereof. The compounds of the present invention can be applied in vitro in the form of solutions, e.g., aqueous solutions, and in vivo either enterally, parenterally, advantageously intravenously, e.g., as a suspension or in aqueous solution. The dosage in vitro may range between about $10^{-3}$ molar and $10^{-9}$ molar concentrations. A therapeutically effective amount in vivo may range depending on the route of administration, between about 0.1-500 mg/kg, or between about 1-100 mg/kg.

The activity of a compound according to the present invention can be assessed by in vitro & in vivo methods, such as those described in the examples below.

The compound of the present invention may be administered either simultaneously with, or before or after, one or more other therapeutic agent. The compound of the present invention may be administered separately, by the same or different route of administration, or together in the same pharmaceutical composition as the other agents.

In one embodiment, the invention provides a product comprising a compound disclosed herein and at least one other therapeutic agent as a combined preparation for simultaneous, separate or sequential use in therapy. In one embodiment, the therapy is the treatment of a disease or condition mediated by TRPC protein activity. In preferred aspects, the therapy is a treatment for nephrotic syndrome, minimal change disease, focal segmental glomerulosclerosis, collapsing glomerulopathy, membranous nephropathy, membranoproliferative glomerulonephritis, IGA nephropathy, acute renal failure, chronic renal failure, diabetic nephropathy, sepsis, pulmonary hypertension, acute lung disorder, acute respiratory distress syndrome (ARDS), heart failure, stroke, malignant tumor, or muscular dystrophy.

Products provided as a combined preparation include a composition comprising the compound disclosed herein and the other therapeutic agent(s) together in the same pharmaceutical composition, or the compound disclosed herein and the other therapeutic agent(s) in separate form, e.g. in the form of a kit.

In one embodiment, the invention provides a pharmaceutical composition comprising a compound as disclosed herein and another therapeutic agent(s). Optionally, the pharmaceutical composition may comprise a pharmaceutically acceptable carrier, as described above.

In one embodiment, the invention provides a kit comprising two or more separate pharmaceutical compositions, at least one of which contains a compound disclosed herein. In one embodiment, the kit comprises means for separately retaining said compositions, such as a container, divided bottle, or divided foil packet. An example of such a kit is a blister pack, as typically used for the packaging of tablets, capsules and the like.

The kit of the invention may be used for administering different dosage forms, for example, oral and parenteral, for administering the separate compositions at different dosage intervals, or for titrating the separate compositions against one another. To assist compliance, the kit of the invention typically comprises directions for administration.

In the combination therapies of the invention, the compound of the invention and the other therapeutic agent may be manufactured and/or formulated by the same or different manufacturers. Moreover, the compound of the invention and the other therapeutic may be brought together into a combination therapy: (i) prior to release of the combination product to physicians (e.g. in the case of a kit comprising the compound of the invention and the other therapeutic agent); (ii) by the physician themselves (or under the guidance of the physician) shortly before administration; (iii) in the patient themselves, e.g. during sequential administration of the compound of the invention and the other therapeutic agent.

Accordingly, the invention provides the use of a compound as disclosed herein for treating a disease or condition mediated by TRPC protein activity wherein the medicament is prepared for administration with another therapeutic agent. The invention also provides the use of another therapeutic agent for treating a disease or condition mediated by the TRPC protein activity, wherein the medicament is administered with a compound as disclosed herein. In another aspect, the invention provides the use of a compound as disclosed herein for treating a disease or disorder selected from nephrotic syndrome, minimal change disease, focal segmental glomerulosclerosis, collapsing glomerulopathy, membranous nephropathy, membranoproliferative glomerulonephritis, IGA nephropathy, acute renal failure, chronic renal failure, diabetic nephropathy, sepsis, pulmonary hypertension, acute lung disorder, acute respiratory distress syndrome (ARDS), heart failure, stroke, malignant tumor, or muscular dystrophy wherein the medicament is prepared for administration with another therapeutic agent. The invention also provides the use of another therapeutic agent for treating a disease or disorder selected from nephrotic syndrome, minimal change disease, focal segmental glomerulosclerosis, collapsing glomerulopathy, membranous nephropathy, membranoproliferative glomerulonephritis, IGA nephropathy, acute renal failure, chronic renal failure, diabetic nephropathy, sepsis, pulmonary hypertension, acute lung disorder, acute respiratory distress syndrome (ARDS), heart failure, stroke, malignant tumor, or muscular dystrophy, wherein the medicament is administered with a compound as disclosed herein.

The invention also provides a compound as disclosed herein for use in a method of treating a disease or condition mediated by TRPC protein activity wherein the compound is prepared for administration with another therapeutic agent. The invention also provides another therapeutic agent for use in a method of treating a disease or condition mediated by TRPC protein activity, wherein the other therapeutic agent is prepared for administration with a compound as disclosed herein. The invention also provides a compound as disclosed herein for use in a method of treating a disease or condition mediated by TRPC protein activity, wherein the compound is administered with another therapeutic agent. The invention also provides another therapeutic agent for use in a method of treating a disease or condition mediated by TRPC protein activity, wherein the other therapeutic agent is administered with a compound as disclosed herein.

The invention also provides the use of a compound as disclosed herein for treating a disease or condition mediated by TRPC protein activity wherein the patient has previously (e.g. within 24 hours) been treated with another therapeutic agent. The invention also provides the use of another therapeutic agent for treating a disease or condition mediated by TRPC protein activity wherein the patient has previously (e.g. within 24 hours) been treated with a compound as disclosed herein.

The pharmaceutical compositions can be administered alone or in combination with other molecules known to have a beneficial effect in treatment of kidney disease or more particularly in the treatment of FSGS, nephrotic syndrome, minimal change diseases or diabetic kidney disease. A combination therapy regimen may be additive, or it may produce synergistic results (e.g., improvement in kidney function which is more than expected for the combined use of the two agents). In some embodiments, the present invention provide a combination therapy for preventing and/or treating kidney disease or more particularly FSGS, nephrotic syndrome or minimal change diseases with a compound of the invention and a second therapeutic agent selected from the group consisting of ACE/ARB (such as captopril, llisinopril or losartan), steroid therapy (such as prednisone), immunomodulators (such as mycophenolate mofetil, tacrolimus or cyclosporine A), adrenocorticotropic hormone analogs (such acthar gel), anti-CD20 antibodies (such as rituximab), calcium channel blockers (such as amlodipine), diuretics (such as hydrochlorothiazide), antiplatelet agents (such as dipyridamole), anticoagulants (such as heparin), DPP-4 inhibitors (such as sitagliptin), SGLT2 inhibitors (such as dapagliflozin), anti-hyperlipidemia (such as rosuvastatin), anemia therapy (darbepoetin alfa), or anti-hyperuricemia (febxostat).

In one embodiment, the invention provides a method of inhibiting the activity of a TRPC protein, or more preferably inhibiting the activity of TRPC6 protein, in a subject, wherein the method comprises administering to the subject a therapeutically effective amount of the compound of the invention. The invention further provides methods of inhibiting the activity of a TRPC protein, or more preferably inhibiting the activity of TRPC6 protein in a subject by administering a compound as disclosed herein, wherein the method comprises administering to the subject a therapeutically effective amount of the compound as disclosed herein.

In one embodiment, the invention provides a compound as disclosed herein, for use as a medicament.

In one embodiment, the invention provides the use of a compound as disclosed herein for the treatment of a disorder or disease in a subject characterized by the activity of a TRPC protein, or more preferably the activity of TRPC6 protein. In particular, the invention provides the use of a compound as disclosed herein for the treatment of a disorder or disease mediated by the activity of a TRPC protein, or more preferably the activity of TRPC6 protein, e.g., nephrotic syndrome, minimal change disease, focal segmental glomerulosclerosis, collapsing glomerulopathy, membranous nephropathy, membranoproliferative glomerulonephritis, IGA nephropathy, acute renal failure, chronic renal failure, diabetic nephropathy, sepsis, pulmonary hypertension, acute lung disorder, acute respiratory distress syndrome (ARDS), heart failure, stroke, malignant tumor, or muscular dystrophy. In certain preferred aspects, the invention provides for the use of a compound as disclosed herein for the treatment of a disorder or disease mediated by the activity of TRPC6 protein selected from nephrotic syndrome, membranous nephropathy and acute renal failure.

In one embodiment, the invention provides the use of a compound as disclosed herein in the manufacture of a medicament for the treatment of a disorder or disease in a subject characterized by activity of a TRPC protein, or more preferably the activity of TRPC6 protein. More particularly in the manufacture of a medicament for the treatment of a disease or disorder in a subject characterized by activity of a TRPC protein, or more preferably the activity of TRPC6 protein, e.g., nephrotic syndrome, minimal change disease, focal segmental glomerulosclerosis, collapsing glomerulopathy, membranous nephropathy, membranoproliferative glomerulonephritis, IGA nephropathy, acute renal failure, chronic renal failure, diabetic nephropathy, sepsis, pulmonary hypertension, acute lung disorder, acute respiratory distress syndrome (ARDS), heart failure, stroke, malignant tumor, or muscular dystrophy. In certain preferred aspects, the invention provides the use of a compound as disclosed herein in the manufacture of a medicament for the treatment of nephrotic syndrome, membranous nephropathy and acute renal failure.

In one embodiment, the invention provides the use of a compound as disclosed herein for the treatment of a disorder or disease in a subject characterized by activity of a TRPC protein, or more preferably the activity of TRPC6 protein. More particularly, the invention provides uses of the compounds provided herein in the treatment of a disease or disorder characterized by activity of a TRPC protein, or more preferably the activity of TRPC6 protein, e.g., nephrotic syndrome, minimal change disease, focal segmental glomerulosclerosis, collapsing glomerulopathy, membranous nephropathy, membranoproliferative glomerulonephritis, IGA nephropathy, acute renal failure, chronic renal failure, diabetic nephropathy, sepsis, pulmonary hypertension, acute lung disorder, acute respiratory distress syndrome (ARDS), heart failure, stroke, malignant tumor, or muscular dystrophy. In certain embodiments, the uses of the compounds provided herein is for the treatment of a disease or disorder is selected from nephrotic syndrome, membranous nephropathy and acute renal failure.

In a specific embodiment, the present invention provides use of the compounds of the invention for treating or preventing nephrotic syndrome, membranous nephropathy, acute renal failure, sepsis, chronic renal failure, diabetic nephropathy, pulmonary hypertension, acute lung disorder, acute respiratory distress syndrome (ARDS), heart failure, stroke, malignant tumor or muscular dystrophy. In certain embodiments, patients who are currently asymptomatic but are at risk of developing a symptomatic nephrotic syndrome, membranous nephropathy, acute renal failure, sepsis, chronic renal failure, diabetic nephropathy, pulmonary hypertension, acute lung disorder, acute respiratory distress syndrome (ARDS), heart failure, stroke, malignant tumor or muscular dystrophy are suitable for administration with a compound of the invention. The use in treating or preventing nephrotic syndrome, membranous nephropathy, acute renal failure, sepsis, chronic renal failure, diabetic nephropathy, pulmonary hypertension, acute lung disorder, acute respiratory distress syndrome (ARDS), heart failure, stroke, malignant tumor or muscular dystrophy include, but are not limited to, uses in treating or preventing one or more symptoms or aspects of nephrotic syndrome, membranous nephropathy, acute renal failure, sepsis, chronic renal failure, diabetic nephropathy, pulmonary hypertension, acute lung disorder, acute respiratory distress syndrome (ARDS), heart failure, stroke, malignant tumor or muscular dystrophy.

The invention further includes any variant of the present processes, in which an intermediate product obtainable at any stage thereof is used as starting material and the remaining steps are carried out, or in which the starting materials are formed in situ under the reaction conditions, or in which the reaction components are used in the form of their salts or optically pure materials.

The following examples are intended to illustrate the invention and are not to be construed as being limitations thereon. Temperatures are given in degrees centigrade (° C.). If not mentioned otherwise, all evaporations are performed under reduced pressure, typically between about 15 mm Hg and 100 mm Hg (=20-133 mbar). The structure of final products, intermediates and starting materials is confirmed by standard analytical methods, e.g., microanalysis and spectroscopic characteristics, e.g., MS, IR, NMR. Abbreviations used are those conventional in the art.

The invention relates also to those forms of the process in which a compound obtainable as an intermediate at any stage of the process is used as starting material and the remaining process steps are carried out, or in which a starting material is formed under the reaction conditions or is used in the form of a derivative, for example in a protected form or in the form of a salt, or a compound obtainable by the process according to the invention is produced under the process conditions and processed further in situ.

All starting materials, building blocks, reagents, acids, bases, dehydrating agents, solvents and catalysts utilized to synthesize the compounds of the present invention are either commercially available or can be produced by organic synthesis methods known to one of ordinary skill in the art.

EXPERIMENTAL

Unless otherwise noted, all materials were obtained from commercial suppliers and used without further purification. All parts are by weight and temperatures are in degrees centigrade unless otherwise indicated. All microwave assisted reactions were conducted with a Smith Synthesizer from Biotage. Mass spectral data was determined by electrospray ionization technique. All examples were purified to >95% purity as determined by high-performance liquid chromatography. Unless otherwise stated, reactions were run at room temperature.

Commercially available materials were purchased from Sigma Aldrich, HDH Pharma, Pharmablock, Alfa Aesar, Enovation Chemicals, and Combi-Blocks.

Compound names, i.e., IUPAC names, for compounds described in the instant application were generated using ChemDraw compound naming software.

The following abbreviations are used:
h—hour L—liters
min—minute aq.—aqueous
rt—room temperature (22-25° C.) cm—centimeters
mL—milliliters um—micron
μL—microliters ee—enantiomeric excess
g—grams s—singlet
μg—micrograms d—doublet
mg—milligrams t—triplet
μmoL—micromolars m—multiplet
CDI—carbonyldiimidazole DEA—diethylamine
TFA—trifluoroacetic acid THF—tetrahydrofuran
DMSO—dimethyl sulfoxide DCM—dichloromethane
LCMS—liquid chromatography-mass spectrometry
BOC—tert-butoxycarbonyl group General Method of Preparation The compounds described herein are prepared using techniques known to one skilled in the art through the reaction sequences depicted in Scheme 1 as well as by other methods.

Furthermore, in the following schemes, where specific acids, bases, reagents, coupling agents, solvents, etc. are mentioned, it is understood that other suitable acids, bases, reagents, coupling agents, solvents, etc. may be used and are included within the scope of the present invention.

Synthesis of selected compounds of the present invention were prepared as described in Scheme 1. CDI coupling of the desired bis-aniline provided the corresponding benzimidazolone. Subjection to refluxing $POCl_3$ delivered the chlorobenzimidazole. These intermediates were heated with base and nucleophile to provide the SnAr products. Alkylation with a variety of electrophiles followed by acidic Boc deprotection furnished the final compounds.

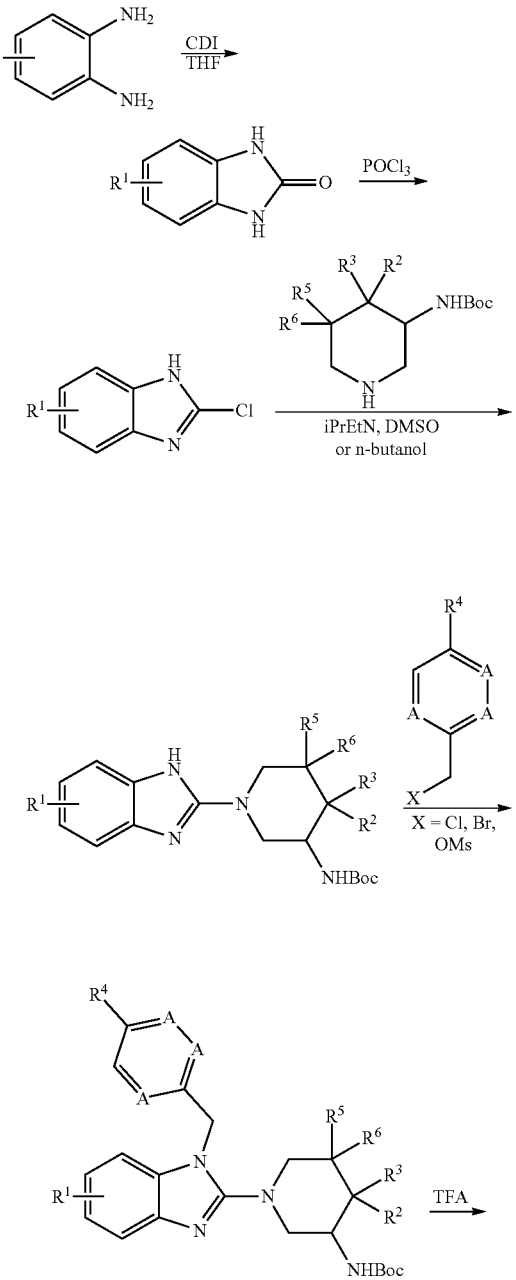

Scheme 1. General Synthesis of Final Products

-continued

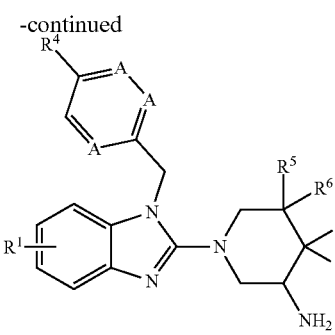

Scheme 2. General Synthesis of SnAr Intermediates

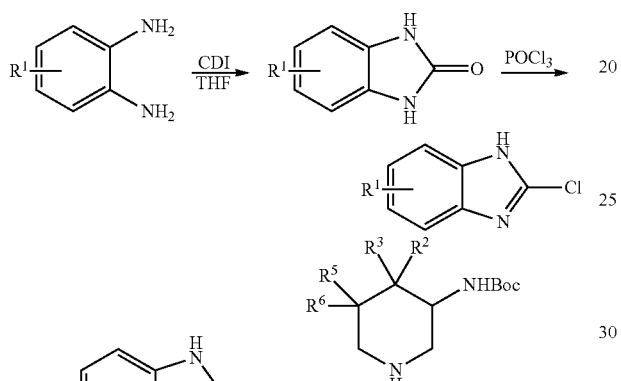

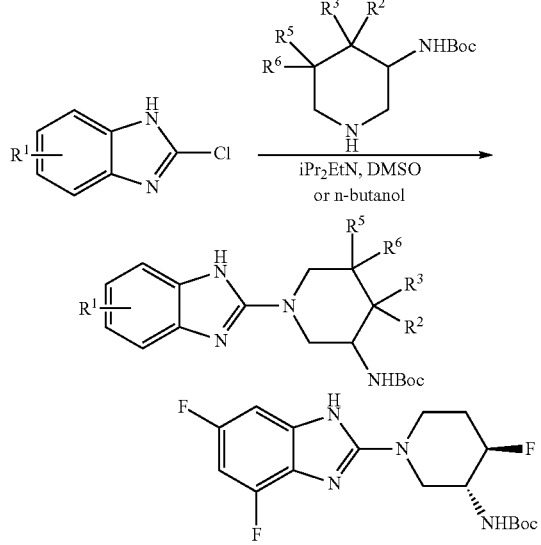

Intermediate I-1: tert-butyl ((3R,4R)-1-(4,6-difluoro-1H-benzimidazol-2-yl)-4-fluoropiperidin-3-yl)carbamate

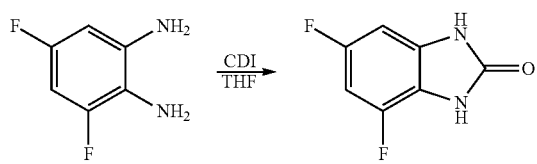

Step 1.
4,6-difluoro-1,3-dihydro-2H-benzimidazol-2-one 3,5-difluorobenzene-1,2-diamine (210.0 g, 1.457 mol, 1.0 equiv) and CDI (236.0 g, 1.457 mol, 1.0 equiv) were dissolved in anhydrous THF (2.5 L, 11.9 mL/g) and stirred for 12 h at room temperature. LCMS indicated completion of the reaction. Reaction mixture was diluted with water (6.0 L) and extracted with ethyl acetate (2×6.0 L). The combined organic layer was dried over sodium sulphate, filtered and concentrated under reduced pressure to provide crude 4,6-difluoro-1,3-dihydro-2H-benzimidazol-2-one (180.0 g, 1.058 mol, 72.6% yield) as black solid which was used for next step without further purification. MS (ESI, pos. ion) m/z: 171.0 [M+1]

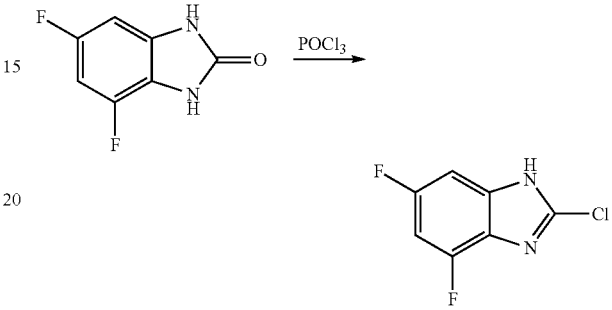

Step 2. 2-chloro-4,6-difluoro-1H-benzimidazole

Crude 4,6-difluoro-1,3-dihydro-2H-benzimidazol-2-one (180.0 g, 1.058 mol, 1.0 equiv) was suspended in POCl$_3$ (2.0 L) and heated under stirring at 110° C. for 2 h. LCMS indicated completion of the reaction. Reaction mass was concentrated under reduced pressure and the residue was diluted with acetonitrile (1.0 L) and sat. aq. sodium bicarbonate solution (1.0 L) and extracted with ethyl acetate (2×4.0 L). The combined organic layer was dried over sodium sulfate, filtered and concentrated under reduced pressure to provide 2-chloro-4,6-difluoro-1H-benzimidazole (105.0 g, 557.0 mmol, 52.6% yield) as brown solid which was used for next reaction without further purification. MS (ESI, pos. ion) m/z: 189.0 [M+1]

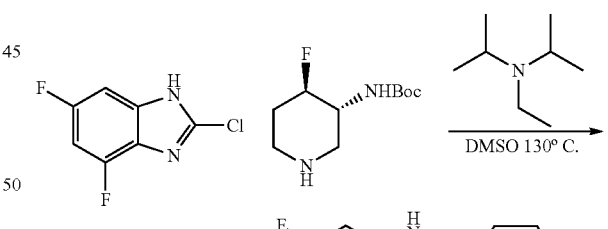

Step 3. tert-butyl ((3R,4R)-1-(4,6-difluoro-1H-benzimidazol-2-yl)-4-fluoropiperidin-3-yl)carbamate (Intermediate I-1)

To a 8-mL vial was added tert-butyl n-[(3r,4r)-4-fluoropiperidin-3-yl]carbamate (0.631 mL, 2.92 mmol, 1.1 equiv), 2-chloro-4,6-difluoro-1H-benzimidazole (500 mg, 2.65 mmol, 1.0 equiv) and 1,1'-dimethyltriethylamine (0.695 mL, 3.98 mmol, 1.5 equiv) in dimethyl sulfoxide (3 mL). The solution was heated to 130° C. overnight. The reaction mixture was allowed to cool to room temperature. The reaction mixture was diluted with ethyl acetate (20 mL) and poured into water (100 mL). The layers were separated and the aqeuous layer was extracted with EtOAc (2×20 mL). The combined organic extract was dried over Na$_2$SO$_4$. The solution was filtered and concentrated in vacuo to give crude tert-butyl ((3R,4R)-1-(4,6-difluoro-1H-benzimidazol-2-yl)-4-fluoropiperidin-3-yl)carbamate (I-1, 714 mg, 2.46 mmol, 93% yield) as a brown solid. The crude product was used without further purification. (ESI, pos. ion) m/z: 371.2 [M+1]

The following intermediates were synthesized using a sequence analogous to that described for intermediate I-1 and general Scheme 2 above:

TABLE 1

| | SnAr Intermediates prepared following Scheme 2 | | |
|---|---|---|---|
| Int # | Structure | Compound Name | MS MH+ |
| I-1 | | tert-butyl ((3R,4R)-1-(4,6-difluoro-1H-benzimidazol-2-yl)-4-fluoropiperidin-3-yl)carbamate | 371.2 |
| I-2 | | tert-butyl ((3R,4R)-4-fluoro-1-(6-fluoro-1H-benzimidazol-2-yl)piperidin-3-yl)carbamate | 353.2 |
| I-3 | | tert-butyl ((3R,4R)-1-(5,6-difluoro-1H-benzimidazol-2-yl)-4-fluoropiperidin-3-yl)carbamate | 371.2 |
| I-4 | | (R)-tert-butyl (1-(4,6-difluoro-1H-benzimidazol-2-yl)-4,4-difluoropiperidin-3-yl)carbamate | 389.2 |
| I-5 | | (R)-tert-butyl (1-(5,6-difluoro-1H-benzimidazol-2-yl)-4,4-difluoropiperidin-3-yl)carbamate | 389.2 |
| I-6 | | (R)-tert-butyl (4,4-difluoro-1-(6-fluoro-1H-benzimidazol-2-yl)piperidin-3-yl)carbamate | 371.2 |
| I-7 | | tert-butyl (R)-(1-(6-cyano-1H-benzimidazol-2-yl)-4,4-difluoropiperidin-3-yl)carbamate | 378.2 |
| I-8 | | tert-butyl ((3R,4R)-1-(4-cyano-6-fluoro-1H-benzimidazol-2-yl)-4-fluoropiperidin-3-yl)carbamate | 378.0 |

TABLE 1-continued
SnAr Intermediates prepared following Scheme 2
| Int # | Structure | Compound Name | MS MH+ |
|---|---|---|---|
| I-9 | | tert-butyl ((3R,4R)-4-fluoro-1-(4-fluoro-6-methoxy-1H-benzimidazol-2-yl)piperidin-3-yl)carbamate | ND (used crude) |
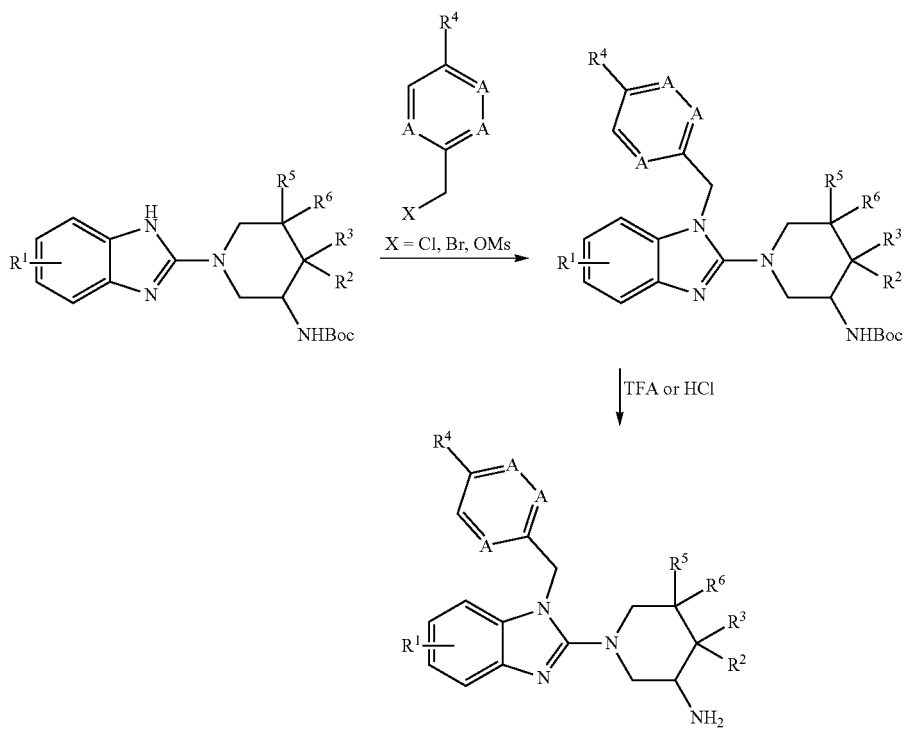
Scheme 3. Advancement of SnAr Intermediates to Final Products
Example 1: (3R,4R)-4-fluoro-1-(5-fluoro-1-((5-fluoropyridin-2-yl)methyl)-1H-benzimidazol-2-yl)piperidin-3-amine
-continued
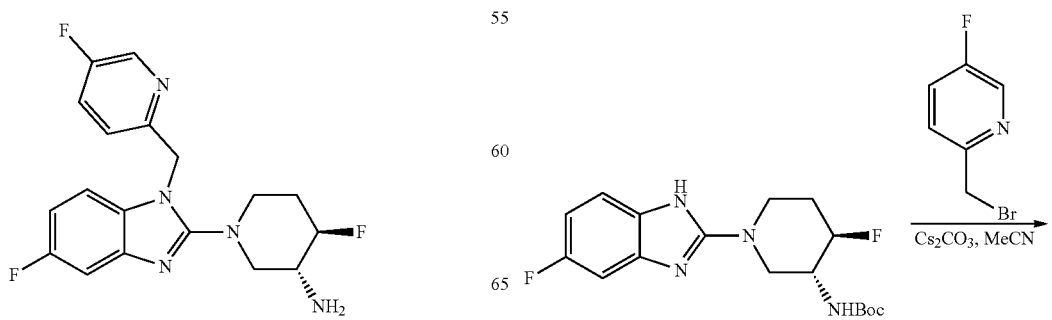

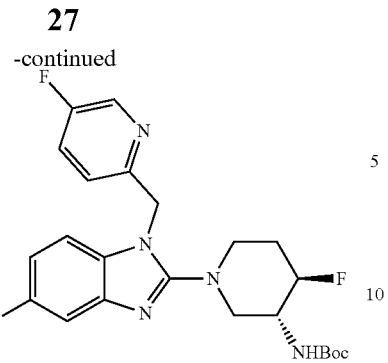

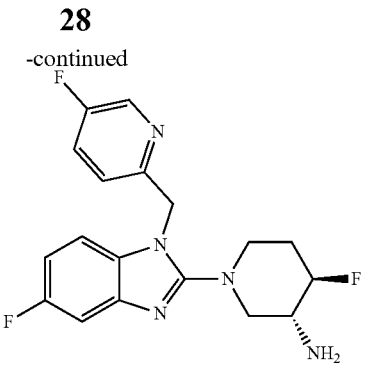

Step 1. tert-butyl ((3R,4R)-4-fluoro-1-(5-fluoro-1-((5-fluoropyridin-2-yl)methyl)-1H-benzimidazol-2-yl)piperidin-3-yl)carbamate A flask was charged with I-1 (4 g, 11.35 mmol), 2-(bromomethyl)-5-fluoropyridine hydrobromide (4.00 g, 14.76 mmol) in acetonitrile (56.8 ml) and Cs2CO3 (11.10 g, 34.1 mmol), and stirred at ambient temperature for 16 h. Reaction mixture was diluted with water (150 mL) and extracted with EtOAc (2×200 mL). Organic layer was washed with water (100 mL), dried over anhydrous Na₂SO₄, and concentrated to obtain a light brown solid. This was purified by Biotage NP (100 g) column by eluting with EtOAc in Heptanes. Pure fractions were combined to obtain tert-butyl ((3R,4R)-4-fluoro-1-(5-fluoro-1-((5-fluoropyridin-2-yl)methyl)-1H-benzimidazol-2-yl)piperidin-3-yl)carbamate (4.4 g, 9.53 mmol, 84% yield, mixture of isomers). Isomer separation was accomplished by SFC using Chiralcel OZ-H 2×25 cm+Chiralcel OZ-H 2×15 cm+Chiralcel OZ-H 2×15 cm, 5 um columns, a mobile phase of 15% ethanol w/0.2% diethylamine using a flowrate of 70 mL/min to generate 1400 mg of peak with an ee of >99% (ESI, pos. ion) m/z: 462.0 [M+1]

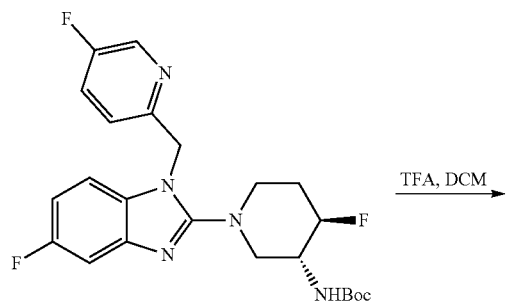

Step 2. (3R,4R)-4-fluoro-1-(5-fluoro-1-((5-fluoropyridin-2-yl)methyl)-1H-benzimidazol-2-yl)piperidin-3-amine (Example 1)

Tert-butyl ((3R,4R)-4-fluoro-1-(5-fluoro-1-((5-fluoropyridin-2-yl)methyl)-1H-benzimidazol-2-yl)piperidin-3-yl)carbamate (1400 mg, 3.03 mmol) was dissolved in a mixture of TFA (10 equiv)/DCM (10 mL). The reaction was stirred at RT until complete by LCMS analysis. The volatiles were removed under reduced pressure and the residue purified using reverse phase conditions (0.1% NH₄OH in ACN and water as mobile phase) to provide the title compound as a white solid (998 mg, 91% yield). ¹H NMR (600 MHz, DMSO-d6) δ 8.50 (d, J=2.88 Hz, 1H) 7.73 (td, J=8.72, 2.96 Hz, 1H) 7.42 (dd, J=8.68, 4.87 Hz, 1H) 7.34 (dd, J=8.72, 4.28 Hz, 1H) 7.07 (dd, J=9.26, 2.49 Hz, 1H) 6.92 (ddd, J=10.06, 8.66, 2.53 Hz, 1H) 5.40 (s, 2H) 4.32-4.45 (m, 1H) 3.38-3.56 (m, 2H) 2.90-3.09 (m, 2H) 2.78 (dd, J=12.46, 8.64 Hz, 1H) 1.98-2.14 (m, 1H) 1.70-1.80 (m, 1H). (ESI, pos. ion) m/z: 362.2 [M+1]

The following Examples were synthesized using a sequence analogous to that described for Example 1 and general Scheme 3 above:

TABLE 2

Compounds made following Scheme 3 and characterization data

| Ex. # | SnAr Intermediate | Electrophile | Structure | Compound Name | MS MH+ |
|---|---|---|---|---|---|
| 1 | I-2 | | | (3R,4R)-4-fluoro-1-(5-fluoro-1-((5-fluoro-2-pyridinyl)methyl)-1H-benzimidazol-2-yl)-3-piperidinamine | 362.2 |

TABLE 2-continued

Compounds made following Scheme 3 and characterization data

| Ex. # | SnAr Intermediate | Electrophile | Structure | Compound Name | MS MH+ |
|---|---|---|---|---|---|
| 2 | I-4 | HBr | | (3R)-1-(5,7-difluoro-1-((5-fluoro-2-pyridinyl)methyl)-1H-benzimidazol-2-yl)-4,4-difluoro-3-piperidinamine | 398.0 |
| 3 | I-2 | HCl | | (3R,4R)-4-fluoro-1-(6-fluoro-1-((5-fluoro-2-pyrimidinyl)methyl)-1H-benzimidazol-2-yl)-3-piperidinamine | 363.2 |
| 4 | I-2 | HBr | | (3R,4R)-4-fluoro-1-(6-fluoro-1-((5-fluoro-2-pyridinyl)methyl)-1H-benzimidazol-2-yl)-3-piperidinamine | 362.2 |
| 5 | I-6 | HCl | | (3R,4R)-1-(1-((5-chloro-2-pyridinyl)methyl)-5-fluoro-1H-benzimidazol-2-yl)-4-fluoro-3-piperidinamine | 396.0 |

TABLE 2-continued

Compounds made following Scheme 3 and characterization data

| Ex. # | SnAr Intermediate | Electrophile | Structure | Compound Name | MS MH+ |
|---|---|---|---|---|---|
| 6 | I-6 | 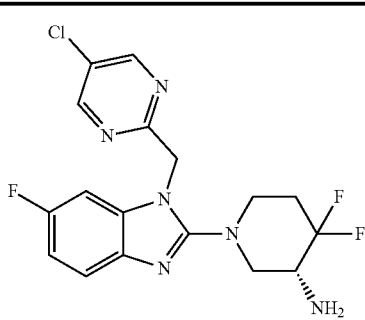 | | (3R)-1-(1-((5-chloro-2-pyrimidinyl)methyl)-6-fluoro-1H-benzimidazol-2-yl)-4,4-difluoro-3-piperidinamine | 397.0 |
| 7 | I-6 | | | (3R)-4,4-difluoro-1-(6-fluoro-1-((5-fluoro-2-pyridinyl)methyl)-1H-benzimidazol-2-yl)-3-piperidinamine | 380.2 |
| 8 | I-3 | 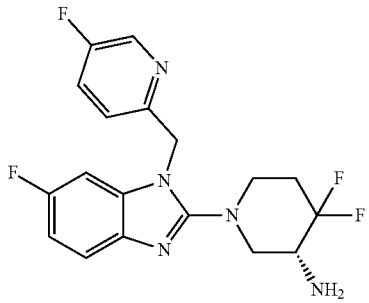 | 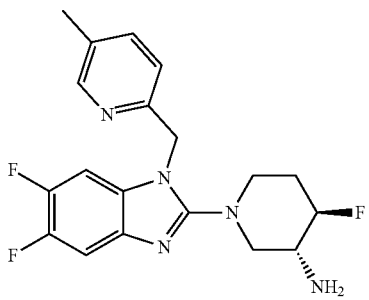 [SMILES: Cc1ccc(Cn2c(N3CC[C@@H](F)[C@H](N)C3)nc3cc(F)c(F)cc32)nc1] | (3R,4R)-1-(5,6-difluoro-1-((5-methyl-2-pyridinyl)methyl)-1H-benzimidazol-2-yl)-4-fluoro-3-piperidinamine | 376.0 |
| 9 | I-1 | | 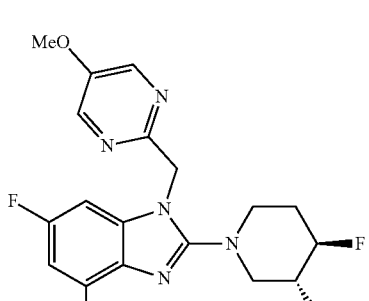 | (3R,4R)-1-(4,6-difluoro-1-((5-methoxy-2-pyrimidinyl)methyl)-1H-benzimidazol-2-yl)-4-fluoro-3-piperidinamine | 393.2 |

TABLE 2-continued

Compounds made following Scheme 3 and characterization data

| Ex. # | SnAr Intermediate | Electrophile | Structure | Compound Name | MS MH+ |
|---|---|---|---|---|---|
| 10 | I-6 | 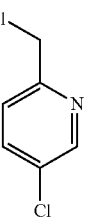 | 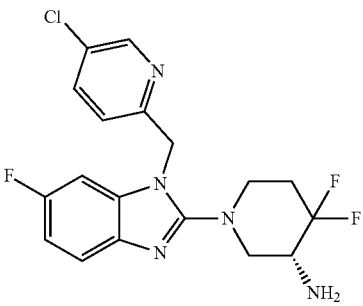 | (3R)-1-(1-((5-chloropyridin-2-yl)methyl)-6-fluoro-1H-benzimidazol-2-yl)-4,4-difluoropiperidin-3-amine | 396.0 |
| 11 | I-2 | 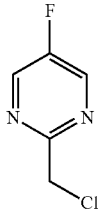 | 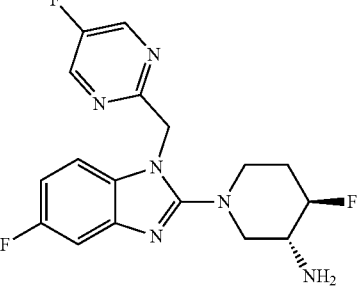 | (3R,4R)-4-fluoro-1-(5-fluoro-1-((5-fluoro-2-pyrimidinyl)methyl)-1H-benzimidazol-2-yl)-3-piperidinamine | 363.2 |
| 12 | I-2 | 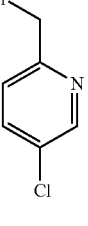 | 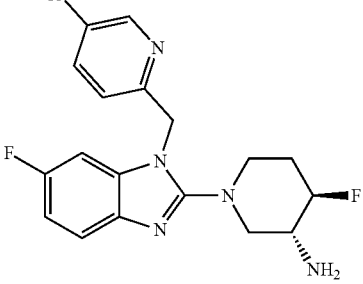 | (3R,4R)-1-(1-((5-chloro-2-pyridinyl)methyl)-6-fluoro-1H-benzimidazol-2-yl)-4-fluoro-3-piperidinamine | 378.0 |
| 13 | I-7 | 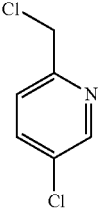 | 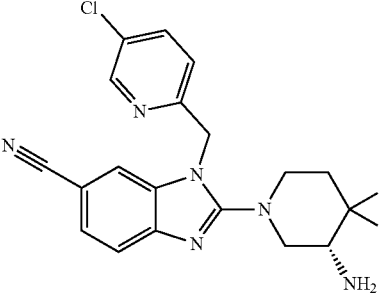 | 2-((3R)-3-amino-4,4-difluoro-1-piperidinyl)-1-((5-chloro-2-pyridinyl)methyl)-1H-benzimidazole-6-carbonitrile | 403.0 |

TABLE 2-continued

Compounds made following Scheme 3 and characterization data

| Ex. # | SnAr Intermediate | Electrophile | Structure | Compound Name | MS MH+ |
|---|---|---|---|---|---|
| 14 | I-4 | 5-chloro-2-(pyrimidinyl)methyl OMs | | (3R)-1-(1-((5-chloro-2-pyrimidinyl)methyl)-4,6-difluoro-1H-benzimidazol-2-yl)-4,4-difluoro-3-piperidinamine | 415.0 |
| 15 | I-8 | (5-fluoro-2-pyridinyl)methyl Br · HBr | | 2-((3R,4R)-3-amino-4-fluoro-1-piperidinyl)-6-fluoro-1-((5-fluoro-2-pyridinyl)methyl)-1H-benzimidazole-4-carbonitrile | 387.2 |
| 16 | I-5 | (5-chloro-2-pyridinyl)methyl Br · HBr | | (3R)-1-(1-((5-chloro-2-pyridinyl)methyl)-5,6-difluoro-1H-benzimidazol-2-yl)-4,4-difluoro-3-piperidinamine | 414.0 |
| 17 | I-5 | 5-chloro-2-(pyrimidinyl)methyl OMs | | (3R)-1-(1-((5-chloro-2-pyrimidinyl)methyl)-5,6-difluoro-1H-benzimidazol-2-yl)-4,4-difluoro-3-piperidinamine | 415.0 |

TABLE 2-continued

Compounds made following Scheme 3 and characterization data

| Ex. # | SnAr Intermediate | Electrophile | Structure | Compound Name | MS MH+ |
|---|---|---|---|---|---|
| 18 | I-3 | 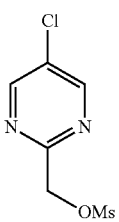 | 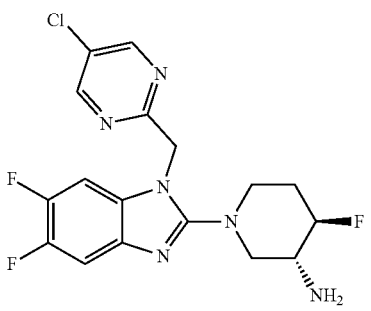 [SMILES: N[C@@H]1CN(c2nc3cc(F)c(F)cc3n2Cc2ncc(Cl)cn2)CC[C@H]1F] | (3R,4R)-1-(1-((5-chloro-2-pyrimidinyl)methyl)-5,6-difluoro-1H-benzimidazol-2-yl)-4-fluoro-3-piperidinamine | 397.0 |
| 19 | I-3 | 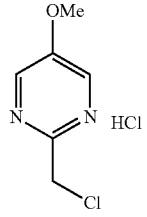 | 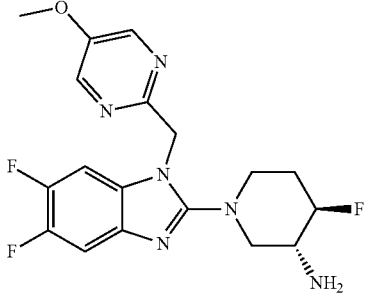 [SMILES: COc1cnc(Cn2c(N3CC[C@@H](F)[C@H](N)C3)nc3cc(F)c(F)cc32)nc1] | (3R,4R)-1-(5,6-difluoro-1-((5-methoxy-2-pyrimidinyl)methyl)-1H-benzimidazol-2-yl)-4-fluoro-3-piperidinamine | 393.2 |
| 20 | I-3 | 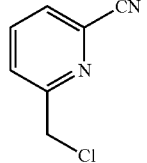 | 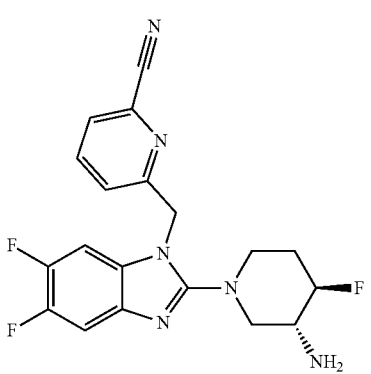 [SMILES: N#Cc1cccc(Cn2c(N3CC[C@@H](F)[C@H](N)C3)nc3cc(F)c(F)cc32)n1] | 6-((2-((3R,4R)-3-amino-4-fluoro-1-piperidinyl)-5,6-difluoro-1H-benzimidazol-1-yl)methyl)-2-pyridinecarbonitrile | 387.2 |
| 21 | I-9 | 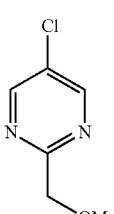 | 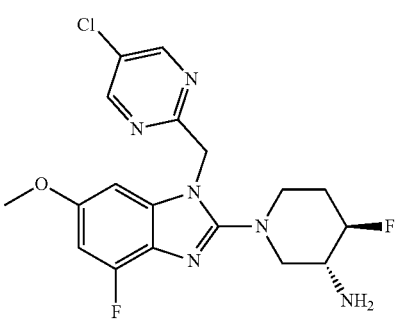 [SMILES: COc1cc(F)c2nc(N3CC[C@@H](F)[C@H](N)C3)n(Cc3ncc(Cl)cn3)c2c1] | (3R,4R)-1-(1-((5-chloropyrimidin-2-yl)methyl)-4-fluoro-6-methoxy-1H-benzimidazol-2-yl)-4-fluoropiperidin-3-amine | 409.2 |

| Ex. # | Freq., Solvent | ¹HNMR Data (δ ppm) | SFC Isomer Separation Conditions |
|---|---|---|---|
| 1 | 600 MHz DMSO-$d_6$ | 8.50 (d, J = 2.88 Hz, 1 H) 7.73 (td, J = 8.72, 2.96 Hz, 1 H) 7.42 (dd, J = 8.68, 4.87 Hz, 1 H) 7.34 (dd, J = 8.72, 4.28 Hz, 1 H) 7.07 (dd, J = 9.26, 2.49 Hz, 1 H) 6.92 (ddd, J = 10.06, 8.66, 2.53 Hz, 1 H) 5.40 (s, 2 H) 4.32-4.45 (m, 1 H) 3.38-3.56 (m, 2 H) 2.90-3.09 (m, 2 H) 2.78 (dd, J = 12.46, 8.64 Hz, 1 H) 1.98-2.14 (m, 1 H) 1.70-1.80 (m, 1 H) | SFC using triple stacked Chiralcel OZ-H 2 × 15 cm, 5 um columns, a mobile phase of 10% ethanol w/0.2% DEA using a flowtme of 80 mL/min Peak 1 |
| 2 | 600 MHz DMSO-$d_6$ | 8.46 (d, J = 2.85 Hz, 1 H) 7.74 (td, J = 8.76, 2.98 Hz, 1 H) 7.38 (dd, J = 8.69, 4.41 Hz, 1 H) 7.17 (dd, J = 9.21, 2.21 Hz, 1 H) 6.88 (t, J = 10.90 Hz, 1 H) 5.48 (s, 2 H) 3.34-3.43 (m, 2 H) 3.14-3.29 (m, 1 H) 3.02-3.08 (m, 1 H) 2.32-2.46 (m, 1 H) 2.26 (br s, 1 H) 2.07 (br s, 1 H) | SFC using Regis Whelk-O s, s 2 × 25 cm + Regis Whelk-O s, s 2 × 15 cm, 5 um columns, a mobile phase of 15% methanol w/0.2% diethylamine using a flowrate of 100 mL/min Peak 2 |
| 3 | 600 MHz DMSO-$d_6$ | 8.88 (s, 2 H) 7.24 (dd, J = 9.77, 2.45 Hz, 1 H) 7.14 (dd, J = 8.72, 4.75 Hz, 1 H) 6.87 (ddd, J = 9.93, 8.72, 2.53 Hz, 1 H) 5.47-5.55 (m, 2 H) 4.36-4.24 (m, 1 H) 3.37-3.48 (m, 2 H) 2.97-3.08 (m, 1 H) 2.84-2.94 (m, 1 H) 2.78 (dd, J = 12.57, 8.68 Hz, 1 H) 1.91-2.09 (m, 1 H) 1.83 (br s, 1 H) 1.64-1.78 (m, 1 H) | SFC using OD, 20 × 250 mm, 5 micron column, a mobile phase of 10% 2-propanol, 0.2% DEA, using a flowrate of 120 mL/min Peak 1 |
| 4 | 600 MHz DMSO-$d_6$ | 8.51 (d, J = 2.88 Hz, 1 H) 7.73 (td, J = 8.74, 2.92 Hz, 1 H) 7.33 (dd, J = 8.68, 4.32 Hz, 1 H) 7.24 (dd, J = 9.77, 2.45 Hz, 1 H) 7.12 (dd, J = 8.72, 4.75 Hz, 1 H) 6.86 (ddd, J = 9.89, 8.72, 2.49 Hz, 1 H) 5.36-5.44 (m, 2 H) 4.37-4.3 (m, 1 H) 3.38-3.56 (m, 4 H) 3.01-3.12 (m, 2 H) 2.89-3.00 (m, 1 H) 2.82 (dd, J = 12.49, 8.60 Hz, 1 H) 1.97-2.15 (m, 1 H) 1.71-1.80 (m, 1 H) | SFC: Phenomenex Lux Cellulose-2 analytical column, 10% ethanol w/0.2% DEA. Peak 2 |
| 5 | 600 MHz DMSO-$d_6$ | 8.56 (d, J = 2.49 Hz, 1 H) 7.93 (dd, J = 8.41, 2.57 Hz, 1 H) 7.27 (d, J = 8.38 Hz, 1 H) 7.24 (d, J = 9.60 Hz, 1 H) 7.11 (dd, J = 8.68, 4.79 Hz, 1 H) 6.87 (ddd, J = 9.91, 8.70, 2.49 Hz, 1 H) 5.37-5.44 (m, 2 H) 4.37-4.3 (m, 1 H) 3.42-3.60 (m, 2 H) 3.01-3.12 (m, 1 H) 2.88-3.00 (m, 1 H) 2.81 (dd, J = 12.53, 8.64 Hz, 1 H) 2.02-2.16 (m, 1 H) 1.70-1.80 (m, 1 H) | FC using a Lux Cellulose-2 3 × 25 cm, 5 um column, a mobile phase of 15% methanol using a flowrate of 180 mL/min Peak 2 |
| 6 | 600 MHz DMSO-$d_6$ | 8.92 (s, 2 H) 7.44 (dd, J = 8.64, 4.90 Hz, 1 H) 7.10 (dd, J = 9.23, 2.45 Hz, 1 H) 6.94 (ddd, J = 10.04, 8.68, 2.53 Hz, 1 H) 5.52-5.60 (m, 2 H) 3.26-3.31 (m, 1 H) 3.12-3.19 (m, 1 H) 3.04-3.11 (m, 1 H) 2.92-2.99 (m, 1 H) 2.17-2.26 (m, 1 H) 1.95-2.05 (m, 1 H) 1.73 (br s, 2 H) | SFC using Chiralcel OD-H 2 × 25 cm + Chiralcel OD-H 2 × 15 cm, 5 um columns, a mobile phase of 20% 2-propanol w/ 0.2% diethylamine using a flowrate of 80 mL/min Peak 1 |
| 7 | 600 MHz DMSO-$d_6$ | 8.50 (d, J = 2.88 Hz, 1 H) 7.74 (td, J = 8.72, 2.96 Hz, 1 H) 7.42-7.46 (m, 1 H) 7.40 (d, J = 8.81 Hz, 1 H) 7.07 (dd, J = 9.26, 2.49 Hz, 1 H) 6.93 (ddd, J = 10.08, 8.68, 2.49 Hz, 1 H) 5.40-5.47 (m, 2 H) 3.29-3.38 (m, 1 H) 3.09-3.26 (m, 2H) 2.96-3.03 (m, 1 H) 2.20-2.30 (m, 1 H) 1.99-2.11 (m, 1 H) 1.77 (br s, 1 H) | SFC using CEL2, 30 × 150 mm, 5 micron column, a mobile phase of 10% methanol, 0.2% diethylamine using a flowrate of 160 mL/min Peak 1 |
| 8 | 600 MHz DMSO-$d_6$ | 8.34 (s, 1 H) 7.61 (dd, J = 8.08, 1.49 Hz, 1 H) 7.48 (dd, J = 11.20, 7.46 Hz, 1 H) 7.28 (dd, J = 10.68, 7.35 Hz, 1 H) 7.13 (d, J = 7.98 Hz, 1 H) 5.35 (s, 2 H) 4.26-4.50 (m, 1 H) 3.40-3.45 (br d, J = 12.55 Hz, 2 H) 3.01-3.10 (m, 1 H) 2.92-3.00 (m, 1 H) 2.82 (dd, J = 12.52, 8.57 Hz, 1 H) 2.27 (s, 3 H) 2.01-2.18 (m, 1 H) 1.71-1.78 (m, 1 H) | N/A |
| 9 | 600 MHz DMSO-$d_6$ | 8.53 (s, 2 H) 6.99 (dd, J = 8.82, 2.34 Hz, 1 H) 6.88-6.97 (m, 1 H) 5.44 (s, 2 H) 4.23-4.48 (m, 1 H) 3.88 (s, 3 H) 3.37-3.44 (m, 2 H)) 2.98-3.07 (m, 1 H) 2.73-2.95 (m, 2 H) 1.97-2.14 (m, 1 H) 1.49-1.76 (m, 1 H) | Separation at BOC-amine stage: The sample was purified by SFC using a Regis Whelk-O s, s 2 × 15 cm, 5 um column, a mobile phase of 25% methanol using a flowrate of 80 mL/min. Peak 2 |
| 10 | 500 MHz DMSO-$d_6$ | 8.55 (d, J = 2.46 Hz, 1H) 7.94 (dd, J = 8.37, 2.53 Hz, 1H) 7.44 (dd, J = 8.69, 4.93 Hz, 1H) 7.33 (d, J = 8.43 Hz, 1H) 7.07 (dd, J = 9.21, 2.47 Hz, 1H) 6.94 (ddd, J = 10.12, 8.69, 2.59 Hz, 1H) 5.44 (s, 2H) 3.33-3.39 (m, 1H) 3.29-3.32 (m, 2H) 3.09-3.24 (m, 2H) 2.99 (br dd, J = 11.03, 8.69 Hz, 1H) 2.20-2.30 (m, 1H) 1.98-2.11 (m, 1H) 1.87 (br s, 1H) | The sample was purified by SFC using triple stacked Chiralcel OZ-H 2 × 25 cm + Chiralcel OZ-H 2 × 15 cm + Chiralcel OZ-H 2 × 15 cm, 5 um columns, a mobile phase of 15% methanol w/0.2% DEA using a flowrate of 80 mL/min. Peak 1 |

| Ex. # | Freq., Solvent | ¹HNMR Data (δ ppm) | SFC Isomer Separation Conditions |
|---|---|---|---|
| 11 | 500 MHz DMSO-d₆ | 8.88 (d, J = 0.78 Hz, 2H) 8.28 (br s, 1H) 7.28 (dd, J = 9.67, 2.40 Hz, 1H) 7.15 (dd, J = 8.82, 4.80 Hz, 1H) 6.91 (ddd, J = 9.89, 8.73, 2.53 Hz, 1H) 5.48-5.61 (m, 2H) 4.62-4.89 (m, 1H) 3.64-3.82 (m, 1H) 3.41-3.61 (m, 3H) 2.98-3.12 (m, 2H) 2.12-2.23 (m, 1H) 1.75-1.86 (m, 1H) | The sample was purified by SFC using Chiralcel OD-H 3 × 25 cm + Chiralcel OD-H 3 × 15 cm, 5 um columns, a mobile phase of 10% 2-propanol w/0.2% diethylamine using a flowrate of 180 mL/min. Peak 2 |
| 12 | 500 MHz DMSO-d₆ | 8.55 (s, 1H) 7.91-7.98 (m, 1H) 7.42-7.48 (m, 1H) 7.33 (d, J = 8.43 Hz, 1H) 7.05-7.13 (m, 1H) 6.94 (dd, J = 8.69, 2.60 Hz, 1H) 6.96 (dd, J = 8.69, 2.47 Hz, 1H) 5.43 (d, J = 1.56 Hz, 2H) 4.57-4.79 (m, 1H) 3.56-3.72 (m, 1H) 3.38-3.50 (m, 3H) 2.94-3.05 (m, 2H) 2.10-2.19 (m, 1H) 1.76-1.87 (m, 1H) | The sample was purified by SFC using Chiralcel OD-H 3 × 25 cm + Chiralcel OD-H 3 × 25 cm, 5 um columns, a mobile phase of 15% 2-propanol w/0.2% diethylamine using a flowrate of 120 mL/min. Peak 1 |
| 13 | 500 MHz DMSO-d₆ | 8.61-8.78 (m, 2H) 8.54 (d, J = 2.47 Hz, 1H) 7.98 (dd, J = 8.43, 2.60 Hz, 1H) 7.76 (d, J = 1.04 Hz, 1H) 7.61 (d, J = 8.17 Hz, 1H) 7.55 (dd J = 8.24, 1.49 Hz, 1H) 7.46 (d, J = 8.56 Hz, 1H) 5.54 (d, J = 5.58 Hz, 2H) 3.96-4.11 (m, 1H) 3.82-3.92 (m, 1H) 3.53-3.62 (m, 1H) 3.20-3.40 (m, 1H) 2.16-2.42 (m, 3H) | The sample was purified by SFC using triple stacked Chiralcel OZ-H 2 × 25 cm + Chiralcel OZ-H 2 × 15 cm + Chiralcel OZ-H 2 × 15 cm, 5 um columns mobile phase of 15% methanol w/0.2% DEA using a flowrate of 80 mL/min. Peak 2 |
| 14 | 500 MHz DMSO-d₆ | 8.92 (s, 2H) 7.56 (br s, 1H) 7.04-7.07 (m, 1H) 7.01 (td, J = 10.64, 2.21 Hz, 1H) 5.55-5.66 (m, 2H) 3.75-3.84 (m, 1H) 3.60 (br d, J = 12.98 Hz, 1H) 3.36-3.47 (m, 1H) 3.12-3.26 (m, 2H) 2.28-2.38 (m, 1H) 2.11-2.23 (m, 1H) | The sample was purified by SFC using Whelk-O1 s,s, 20 × 150 mm, 5 micron column, a mobile phase of 20% methanol, using a flowrate of 160 mL/min. Peak 2 |
| 15 | 500 MHz DMSO-d₆ | 8.48 (d, J = 2.85 Hz, 1H) 7.77 (td, J = 8.69, 2.98 Hz, 1H) 7.53-7.57 (m, 2H) 7.48 (dd, J = 8.69, 4.41 Hz, 1H) 5.50 (s, 2H) 4.52-4.79 (m, 1H) 3.80-3.85 (m, 1H) 3.57 (br d, J = 13.49 Hz, 1H) 3.34-3.44 (m, 1H) 3.04-3.09 (m, 2H) 2.14-2.18 (m, 1H) 1.77-1.82 (m, 1H) | The sample was purified by SFC using double stacked Regis Whelk-O s, s 2 × 15 cm, 5 um columns, a mobile phase of 20% methanol using a flowrate of 80 mL/min. Peak 2 |
| 16 | 500 MHz DMSO-d₆ | 8.54 (s, 1H) 7.96 (dd, J = 8.37, 2.53 Hz, 1H) 7.52-7.58 (m, 1H) 7.36-7.40 (m, 1H) 7.31-7.37 (m, 1H) 5.46 (d, J = 5.58 Hz, 2H) 3.86 (br s, 1H) 3.64 (br d, J = 12.85 Hz, 1H) 3.41 (br d, J = 13.62 Hz, 1H) 3.16-3.27 (m, 2H) 2.30-2.37 (m, 1H) 2.18-2.27 (m, 1H) | N/A |
| 17 | 500 MHz DMSO-d₆ | 8.92 (s, 2H) 7.81-8.05 (m, 2H) 7.52-7.59 (m, 1H) 7.39-7.44 (m, 1H) 5.51-5.66 (m, 2H) 3.85-3.90 (m, 1H) 3.60 (br d, J = 12.85 Hz, 1H) 3.34-3.40 (m, 1H) 3.22 (br dd, J = 12.72, 9.34 Hz, 1 H) 3.12-3.17 (m, 1H) 2.32-2.37 (m, 1H) 2.10-2.28 (m, 1H) | N/A |
| 18 | 500 MHz DMSO-d₆ | 8.92 (s, 2H) 7.49 (dd, J = 11.17, 7.43 Hz, 1H) 7.39 (dd, J = 10.67, 7.32 Hz, 1H) 5.48-5.56 (m, 2H) 4.24-4.43 (m, 1H) 2.95-3.05 (m, 1H) 2.81-2.90 (m, 1H) 2.74 (dd, J = 12.53, 8.56 Hz, 1H) 1.95-2.13 (m, 2H) 1.91 (br s, 1H) 1.55-1.81 (m, 2H) | N/A |
| 19 | 500 MHz DMSO-d₆ | 8.53 (s, 2H) 8.14 (s, 2H) 7.52 (dd, J = 11.03, 7.40 Hz, 1H) 7.34 (dd, J = 10.64, 7.27 Hz, 1H) 5.41-5.50 (m, 2H) 4.66-4.87 (m, 1H) 3.89 (s, 3H) 3.72 (br d, J = 13.62 Hz, 1H) 3.40-3.57 (m, 2H) 2.97-3.08 (m, 2H) 2.16 (br s, 1H) 1.79 (br s, 1H) | N/A |
| 20 | 500 MHz DMSO-d₆ | 8.02-8.10 (m, 1H) 7.98 (d, J = 7.40 Hz, 1H) 7.50-7.59 (m, 2H) 7.40 (dd, J = 10.64, 7.27 Hz, 1H) 5.47-5.56 (m, 2H) 4.65-4.85 (m, 1H) 3.61-3.78 (m, 1H) 3.44-3.59 (m, 2H) 2.97-3.09 (m, 2H) 2.12-2.20 (m, 1H) 1.75-1.85 (m, 1H) | N/A |
| 21 | 500 MHz DMSO-d₆ | 8.91 (s, 2H) 6.70 (dd, J = 8.91, 2.22 Hz, 1H) 6.58 (dd, J = 12.18, 2.22 Hz, 1H) 5.44-5.51 (m, 2H) 4.22-4.40 (m, 1H) 3.89 (s, 3H) 2.94 (br t, J = 10.00 Hz, 1H) 2.82-2.90 (m, 1H) 2.70 (d, J = 12.38, 8.64 Hz, 1H) 1.95-2.12 (m, 2H) 1.63-1.81 (m, 1H) | The sample was purified by SFC using a Regis Whelk-O s, s 2 × 15 cm, 5 um column, a mobile phase of 25% methanol w/0.2% DEA using a flowrate of 80 mL/min. Peak 2 |

Biological Example 1 TRPC6 Calcium Flux Assay

Potency of TRPC6 (Transient receptor potential channel family C6) inhibitors were measured by their inhibition of Calcium influx trigged by OAG (1-Oleoyl-2-acetyl-sn-glycerol, Millipore Sigma, O6754) stimulation on HEK293 cells stably transfected with human TRPC6 using a FLIPR tetra system (BD PBX Calcium Assay Kit; BD Biosciences, San Jose Calif.). Cells were grown in a humidified environment at 37° C. under 5% $CO_2$ using the growth medium with the following selective reagents (Dulbecco's Modified Eagle's Medium (DMEM) high glucose, 10% Fetal Bovine Serum, 1×PSGlu (penicillin-streptomycin glutamine), 1×NEAA (Non-essential amino acid), 1×Na Pyruvate and 200 ug/ml Hygromycin). For general passage, cells were grown to 70-90% confluency; the media was removed, and the cells were gently washed 2 times with calcium and magnesium free PBS (phosphate-buffered saline). Trypsin (3 mL) was applied for 5 minutes at 37° C. The cells were dislodged by rapping flask against base of a hand and 7 mL of growth medium was added to deactivate trypsin and re-suspend cells. The usual splitting schedule was 1:5 every 2-3 days.

Cells were plated the day before the assay, plating cell density is $1.0-1.5\times10^4/25$ μl/well in poly-D-lysine (PDL) coated 384-well plates using either multichannel pipettes or multidrop. These cells were first incubated with fluorescence dye at room temperature for 90-120 minutes after they were grown on PDL-coated 384-well black plates overnight (Dye loading buffer 10 ml example: 9 mL assay buffer, 1 mL, 10×PBX signal enhancer, 10 μL Calcium indicator). The cells were incubated with a dose of compounds for 25 minutes before being stimulated with TRPC6 agonist OAG. The OAG solution was prepared by adding OAG into assay buffer (Ca ringer solution base: 10 mM HEPES (4-(2-hydroxyethyl)-1-piperazine-ethanesulfonic acid), 4 mM $MgCl_2$, 120 mM NaCl, 5 mM KCl, pH=7.2 @25° C.)+0.1% BSA+2 mM $CaCl_2$) to the concentration of 0.2 mM/2% DMSO, which achieves a final on cell concentration of 50 uM/0.5% DMSO. 12.5 uL OAG mixture was added and the activation of the TRPC6 channel was measured by the change of intracellular Calcium levels on FLIPR terra system.

Data was acquired by measuring the fluorescent peak signal subtracted from the background during the 180 second imaging frame. Each data point is further normalized to 100% of OAG triggered signal vs. buffer. Table 3 provides the $IC_{50}$ for each compound, which data is obtained by plotting peak signal over the compound dose.

TABLE 3 hTRPC6 Potency measured for Examples 1-21

| Ex. # | hTRPC6 Potency (μM) | Ex. # | hTRPC6 Potency (μM) |
|---|---|---|---|
| 1 | 0.0007 | 2 | 0.0022 |
| 3 | 0.0002 | 4 | 0.0004 |
| 5 | 0.0003 | 6 | 0.001 |
| 7 | 0.0229 | 8 | 0.0001 |
| 9 | 0.0005 | 10 | 0.0025 |
| 11 | 0.0004 | 12 | 0.001 |
| 13 | 0.0013 | 14 | 0.0012 |
| 15 | 0.001 | 16 | 0.0006 |
| 17 | 0.0006 | 18 | 0.0012 |
| 19 | 0.0012 | 20 | 0.0018 |
| 21 | 0.0004 | | |

The foregoing is merely illustrative of the invention and is not intended to limit the invention to the disclosed compounds. Variations and changes which are obvious to one skilled in the art are intended to be within the scope and nature of the invention which are defined in the appended claims.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A compound or a salt thereof selected from
(3R,4R)-4-fluoro-1-(5-fluoro-1-((5-fluoro-2-pyridinyl) methyl)-1H-benzimidazol-2-yl)-3-piperidinamine;
(3R)-1-(5,7-difluoro-1-((5-fluoro-2-pyridinyl) methyl)-1H-benzimidazol-2-yl)-4,4-difluoro-3-piperidinamine;
(3R,4R)-4-fluoro-1-(6-fluoro-1-((5-fluoro-2-pyrimidinyl) methyl)-1H-benzimidazol-2-yl)-3-piperidinamine;
(3R,4R)-4-fluoro-1-(6-fluoro-1-((5-fluoro-2-pyridinyl) methyl)-1H-benzimidazol-2-yl)-3-piperidinamine;
(3R,4R)-1-(1-((5-chloro-2-pyridinyl)methyl)-5-fluoro-1H-benzimidazol-2-yl)-4-fluoro-3-piperidinamine;
(3R)-1-(1-((5-chloro-2-pyrimidinyl)methyl)-6-fluoro-1H-benzimidazol-2-yl)-4,4-difluoro-3-piperidinamine;
(3R)-4,4-difluoro-1-(6-fluoro-1-((5-fluoro-2-pyridinyl) methyl)-1H-benzimidazol-2-yl)-3-piperidinamine;
(3R,4R)-1-(5,6-difluoro-1-((5-methyl-2-pyridinyl) methyl)-1H-benzimidazol-2-yl)-4-fluoro-3-piperidinamine;
(3R,4R)-1-(4,6-difluoro-1-((5-methoxy-2-pyrimidinyl) methyl)-1H-benzimidazol-2-yl)-4-fluoro-3-piperidinamine;
(3R)-1-(1-((5-chloropyridin-2-yl)methyl)-6-fluoro-1H-benzimidazol-2-yl)-4,4-difluoropiperidin-3-amine;
(3R,4R)-4-fluoro-1-(5-fluoro-1-((5-fluoro-2-pyrimidinyl) methyl)-1H-benzimidazol-2-yl)-3-piperidinamine;
(3R,4R)-1-(1-((5-chloro-2-pyridinyl)methyl)-6-fluoro-1H-benzimidazol-2-yl)-4-fluoro-3-piperidinamine;
2-((3R)-3-amino-4,4-difluoro-1-piperidinyl)-1-((5-chloro-2-pyridinyl)methyl)-1H-benzimidazole-6-carbonitrile;
(3R)-1-(1-((5-chloro-2-pyrimidinyl)methyl)-4,6-difluoro-1H-benzimidazol-2-yl)-4,4-difluoro-3-piperidinamine;
2-((3R,4R)-3-amino-4-fluoro-1-piperidinyl)-6-fluoro-1-((5-fluoro-2-pyridinyl)methyl)-1H-benzimidazole-4-carbonitrile;
(3R)-1-(1-((5-chloro-2-pyridinyl)methyl)-5,6-difluoro-1H-benzimidazol-2-yl)-4,4-difluoro-3-piperidinamine;
(3R)-1-(1-((5-chloro-2-pyrimidinyl)methyl)-5,6-difluoro-1H-benzimidazol-2-yl)-4,4-difluoro-3-piperidinamine;
(3R,4R)-1-(1-((5-chloro-2-pyrimidinyl)methyl)-5,6-difluoro-1H-benzimidazol-2-yl)-4-fluoro-3-piperidinamine;
(3R,4R)-1-(5,6-difluoro-1-((5-methoxy-2-pyrimidinyl) methyl)-1H-benzimidazol-2-yl)-4-fluoro-3-piperidinamine;
6-((2-((3R,4R)-3-amino-4-fluoro-1-piperidinyl)-5,6-difluoro-1H-benzimidazol-1-yl)methyl)-2-pyridinecarbonitrile;
and (3R,4R)-1-(1-((5-chloropyrimidin-2-yl)methyl)-4-fluoro-6-methoxy-1H-benzimidazol-2-yl)-4-fluoropiperidin-3-amine.

2. The compound of any one of claim 1 in a form of a pharmaceutically acceptable salt.

3. A pharmaceutical composition comprising a pharmaceutically acceptable excipient, carrier or adjuvant and at least one compound of claim 1.

4. A pharmaceutical composition comprising a pharmaceutically acceptable excipient, carrier or adjuvant and at least one pharmaceutically acceptable salt of claim 2.

5. A method for modulating TRPC6 activity in a mammal which method comprises administering to the mammal an amount of at least one compound of claim 1 or a pharmaceutically acceptable salt thereof or a pharmaceutical composition thereof to modulate TRPC6 activity in the mammal.

* * * * *